US012587246B2

(12) United States Patent
Go et al.

(10) Patent No.: US 12,587,246 B2
(45) Date of Patent: Mar. 24, 2026

(54) METHOD AND DEVICE FOR TRANSMITTING OR RECEIVING CHANNEL STATE INFORMATION IN WIRELESS COMMUNICATION SYSTEM

(71) Applicant: LG ELECTRONICS INC., Seoul (KR)

(72) Inventors: Seongwon Go, Seoul (KR); Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 18/033,940

(22) PCT Filed: Jan. 5, 2022

(86) PCT No.: PCT/KR2022/000120
§ 371 (c)(1),
(2) Date: Apr. 26, 2023

(87) PCT Pub. No.: WO2022/149838
PCT Pub. Date: Jul. 14, 2022

(65) Prior Publication Data
US 2024/0030979 A1      Jan. 25, 2024

(30) Foreign Application Priority Data

Jan. 8, 2021    (KR) ........................ 10-2021-0002893
Jan. 14, 2021   (KR) ........................ 10-2021-0005597
Aug. 6, 2021    (KR) ........................ 10-2021-0104019

(51) Int. Cl.
*H04B 7/06*         (2006.01)
*H04B 17/318*       (2015.01)

(52) U.S. Cl.
CPC ......... *H04B 7/0626* (2013.01); *H04B 17/328* (2023.05)

(58) Field of Classification Search
None
See application file for complete search history.

(56) References Cited

U.S. PATENT DOCUMENTS

2018/0368142 A1* 12/2018 Liou ................. H04W 74/0808
2019/0190582 A1*  6/2019 Guo ..................... H04B 17/327
(Continued)

FOREIGN PATENT DOCUMENTS

WO        2020056708        3/2020

OTHER PUBLICATIONS

Nokia et al., Enhancements on Beam Management for Multi-TRP/ Panel Transmission, R1-2008906, 3GPP TSG RAN WG1 #103-e Meeting, e-Meeting, Nov. 2, 2020, See section 2.1.
(Continued)

*Primary Examiner* — Minh Trang T Nguyen
(74) *Attorney, Agent, or Firm* — BRYAN CAVE LEIGHTON PAISNER LLP

(57)                ABSTRACT
A method for reporting channel state information (CSI) by a terminal in a wireless communication system according to an embodiment of the present specification comprises the steps of: receiving configuration information related to channel state information (CSI): receiving a downlink reference signal (DL RS); calculating the CSI on the basis of the DL RS; and reporting the CSI. The CSI relates to group-based beam reporting, and a specific reference for the CSI reporting may be set for each group on the basis of the configuration information. The CSI includes information on one or more of DL RSs on the basis of the specific reference for each group.

14 Claims, 17 Drawing Sheets

(56)  References Cited

U.S. PATENT DOCUMENTS

2020/0059290 A1    2/2020   Pan et al.
2020/0389875 A1    12/2020  Guo et al.

OTHER PUBLICATIONS

Xiaomi, Enhancement on beam management for Multi-TRP, R1-2009030, 3GPP TSG RAN WG1 #103-e Meeting, e-Meeting, Nov. 1, 2020, See section 2.1.

* cited by examiner

[FIG. 1]
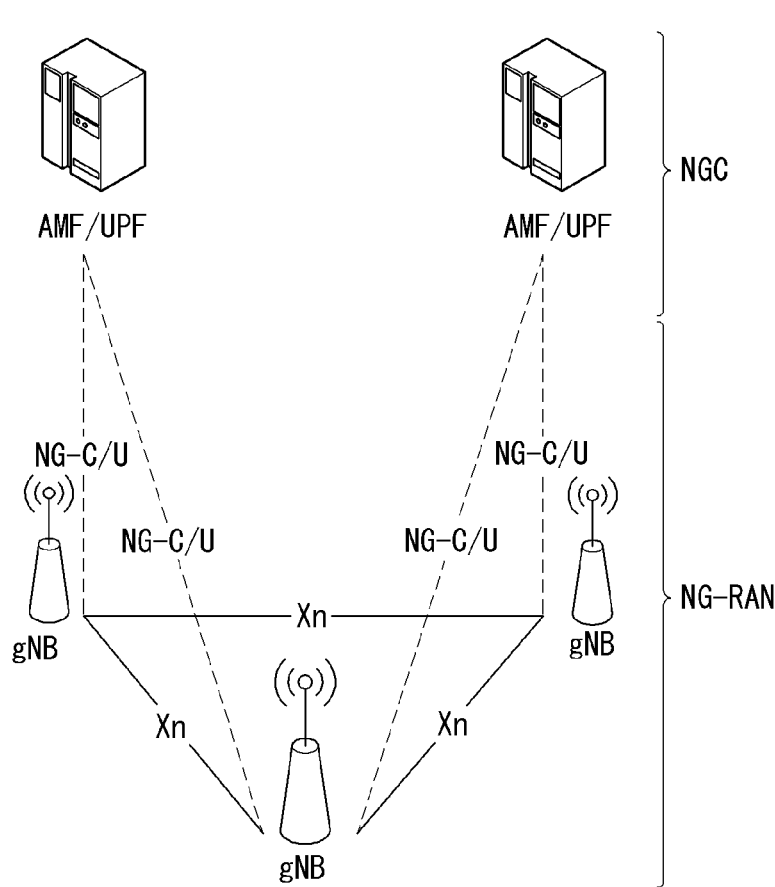

[FIG. 2]
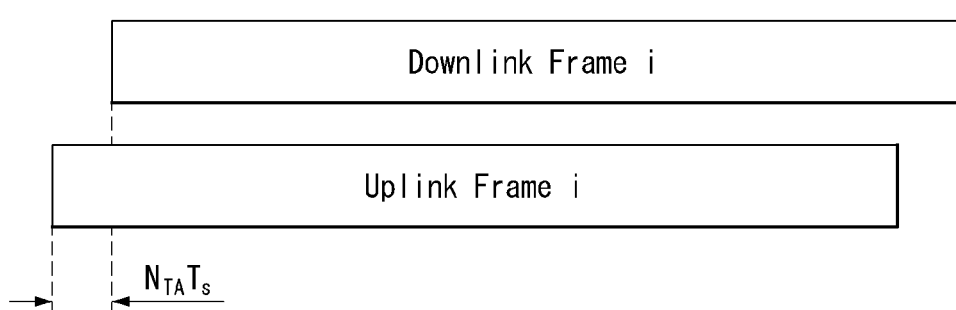

[FIG. 3]
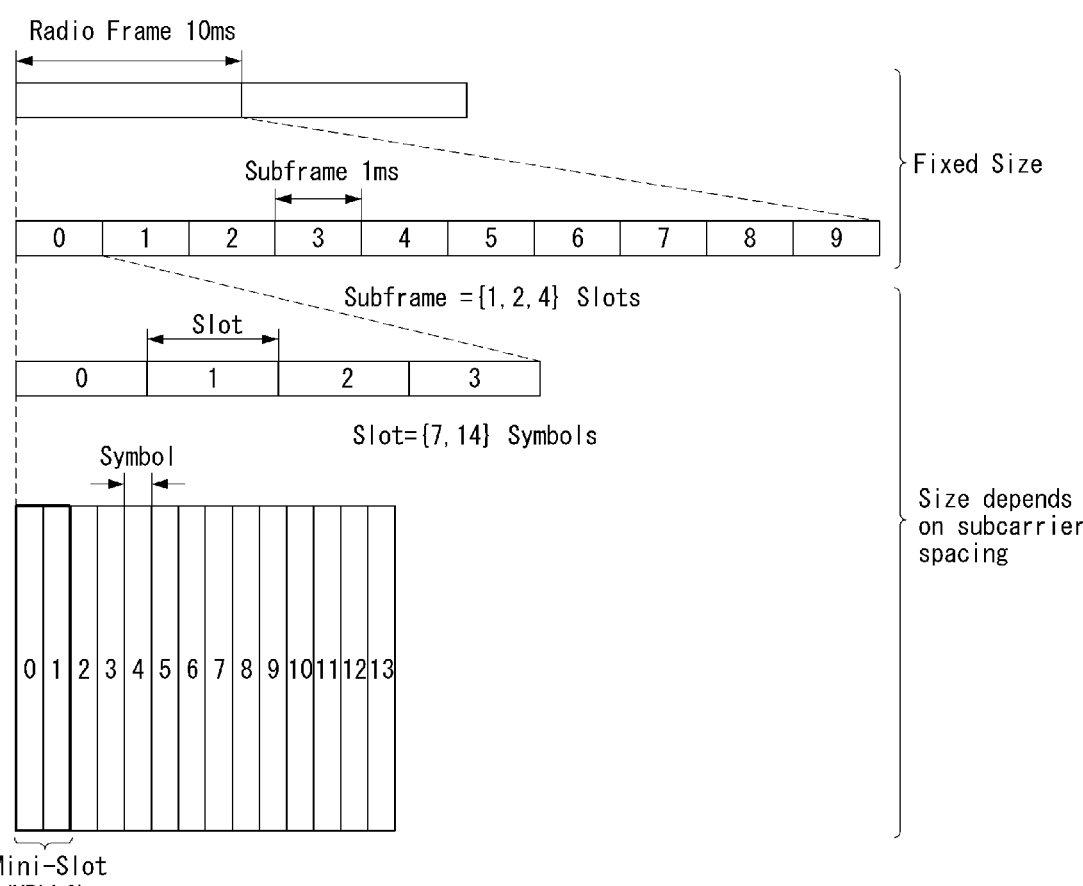
Radio Frame 10ms
Subframe 1ms
Fixed Size
0 1 2 3 4 5 6 7 8 9
Subframe ={1, 2, 4} Slots
Slot
0 1 2 3
Slot={7, 14} Symbols
Symbol
0 1 2 3 4 5 6 7 8 9 10 11 12 13
Size depends
on subcarrier
spacing
Mini-Slot
(URLLC)
Mini-Slot={2, 4, 7} Symbols - ffs

[FIG. 4]
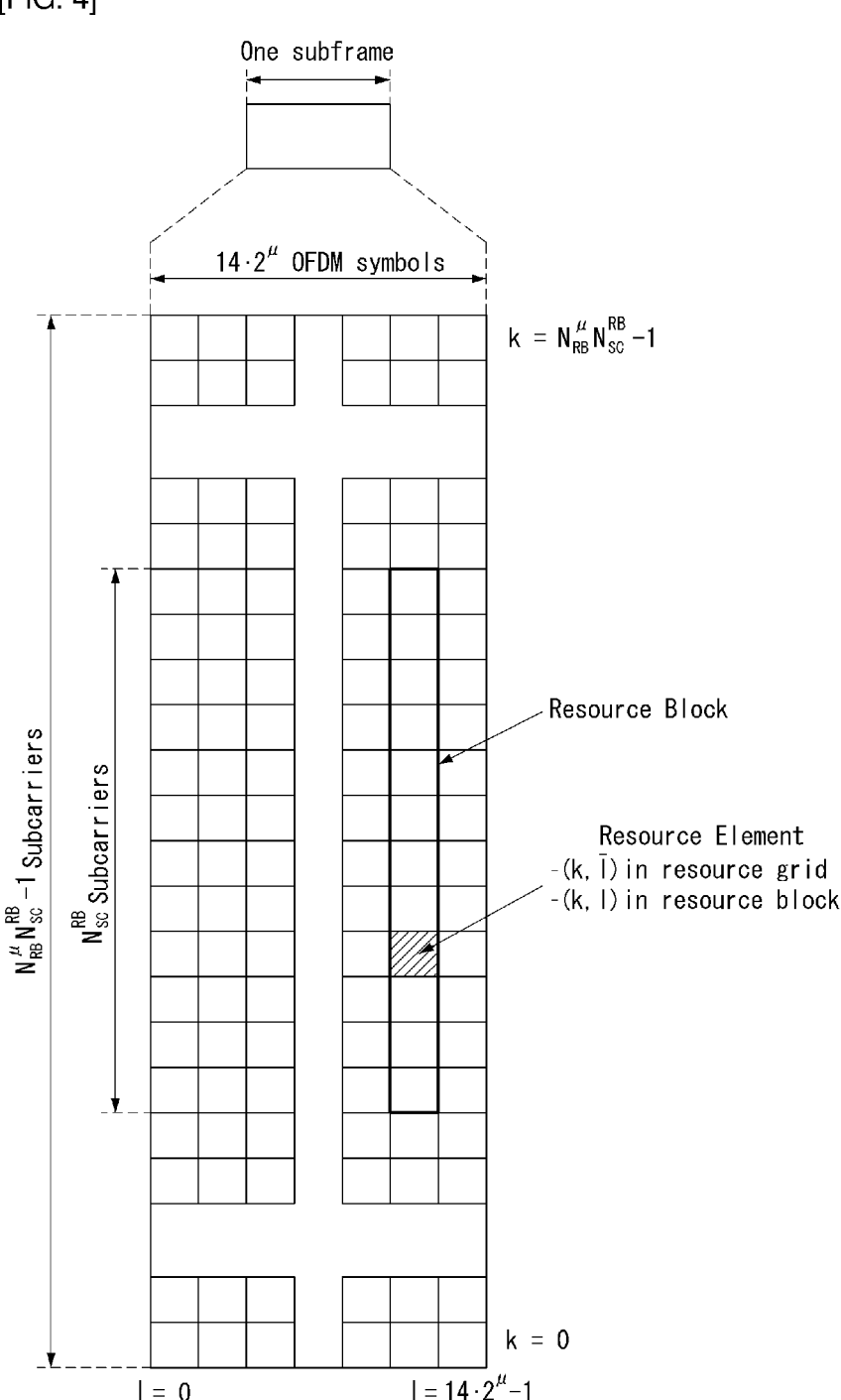

[FIG. 5]

Antenna port A
Antenna port B } Numerology X

Antenna port A
Antenna port B } Numerology Y

[FIG. 6]
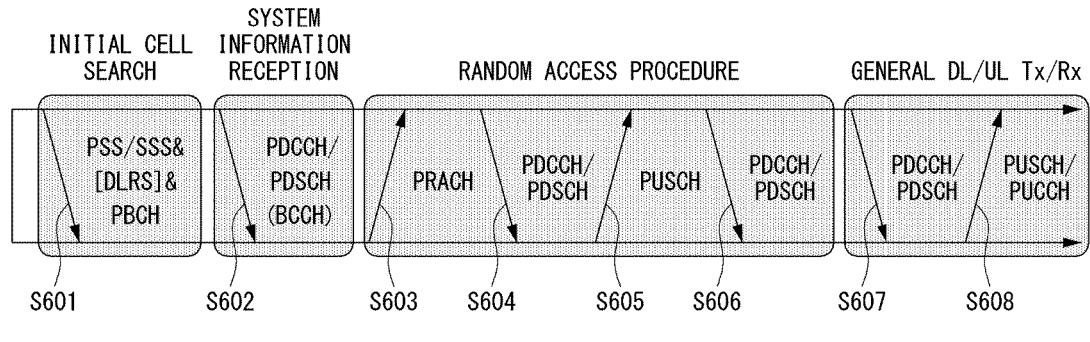
· DL/UL ACK/NACK
· UE CQI/PMI RI REPORT
  USING PUSCH AND PUCCH

[FIG. 7]

[FIG. 8]
Base station Rx beam sweeping
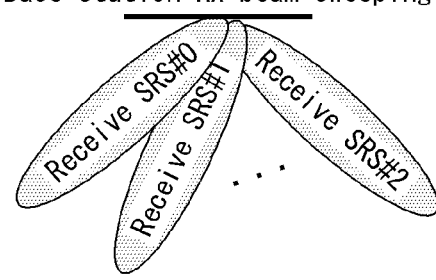
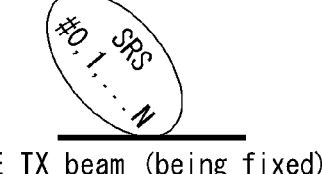
UE TX beam (being fixed)
(a)
Base station beam being fixed
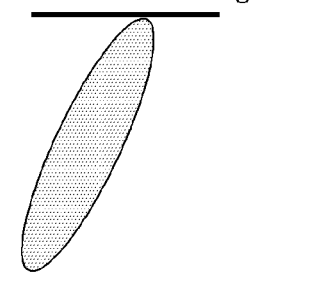
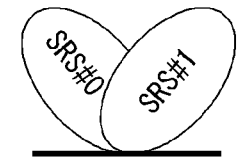
UE Tx beam sweeping
(b)

[FIG. 9]
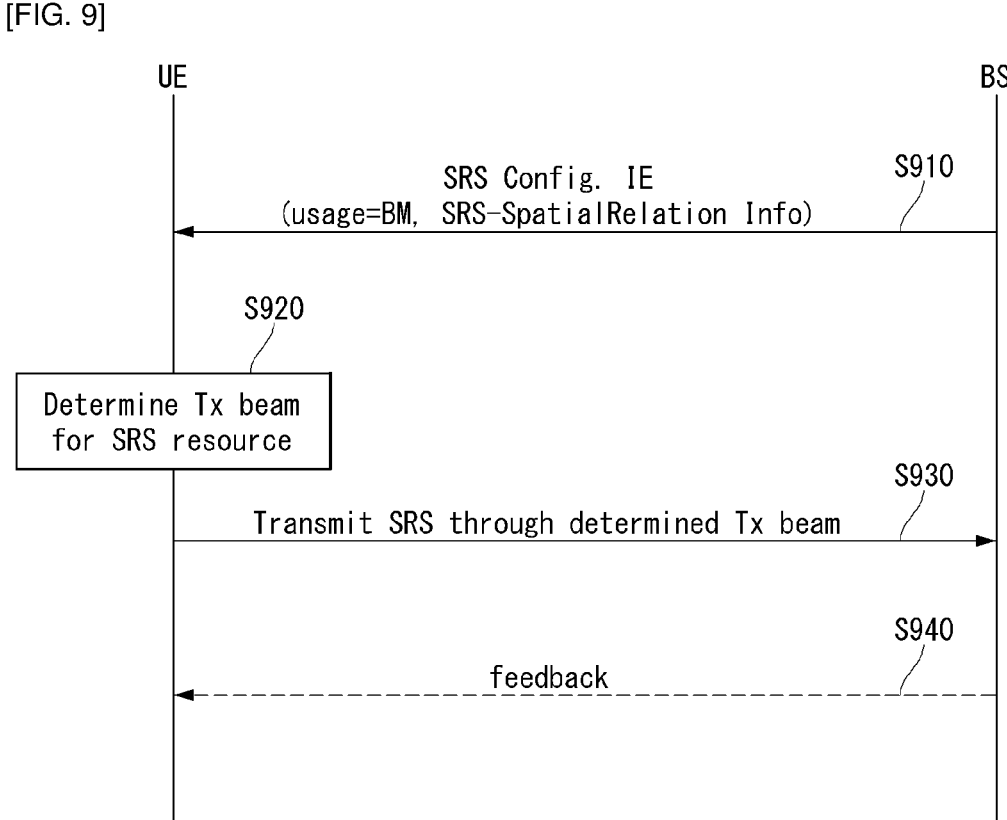

[FIG. 10]
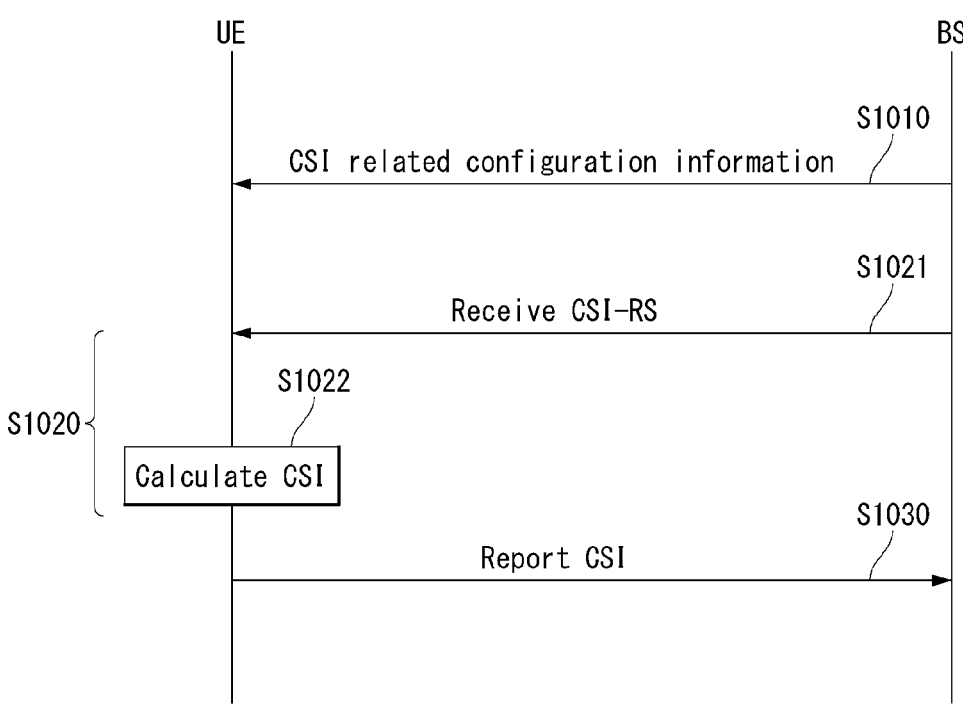

[FIG. 11]

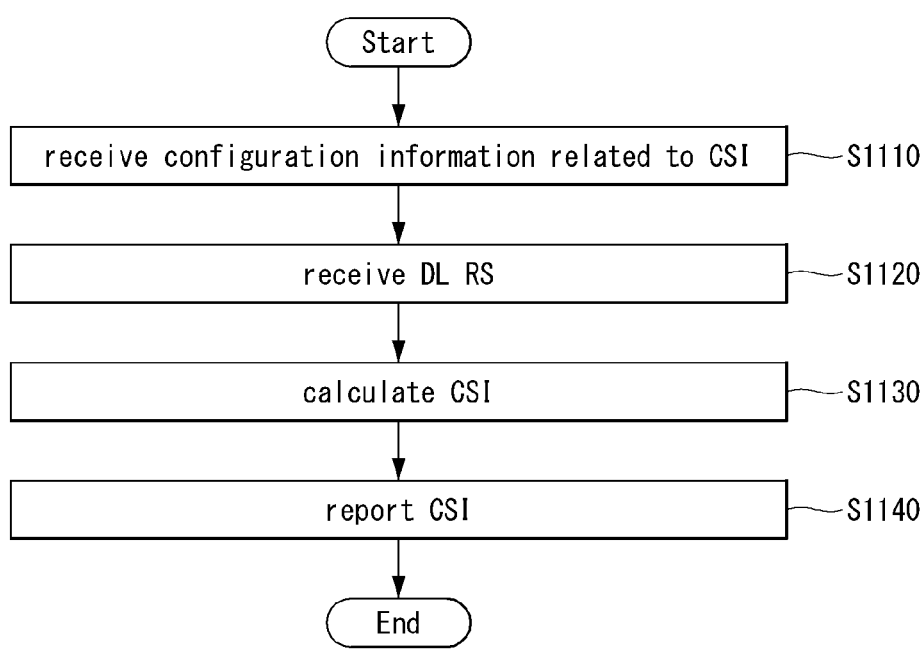

```
                    ( Start )
                        │
                        ▼
┌──────────────────────────────────────────────┐
│ receive configuration information related to CSI │──── S1110
└──────────────────────────────────────────────┘
                        │
                        ▼
┌──────────────────────────────────────────────┐
│               receive DL RS                    │──── S1120
└──────────────────────────────────────────────┘
                        │
                        ▼
┌──────────────────────────────────────────────┐
│               calculate CSI                    │──── S1130
└──────────────────────────────────────────────┘
                        │
                        ▼
┌──────────────────────────────────────────────┐
│                report CSI                      │──── S1140
└──────────────────────────────────────────────┘
                        │
                        ▼
                    ( End )
```

[FIG. 12]
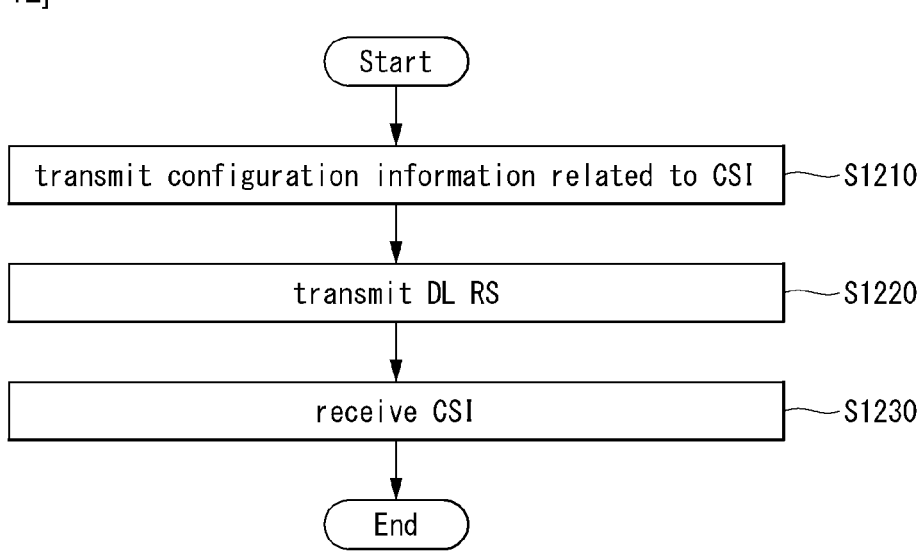

[FIG. 13]
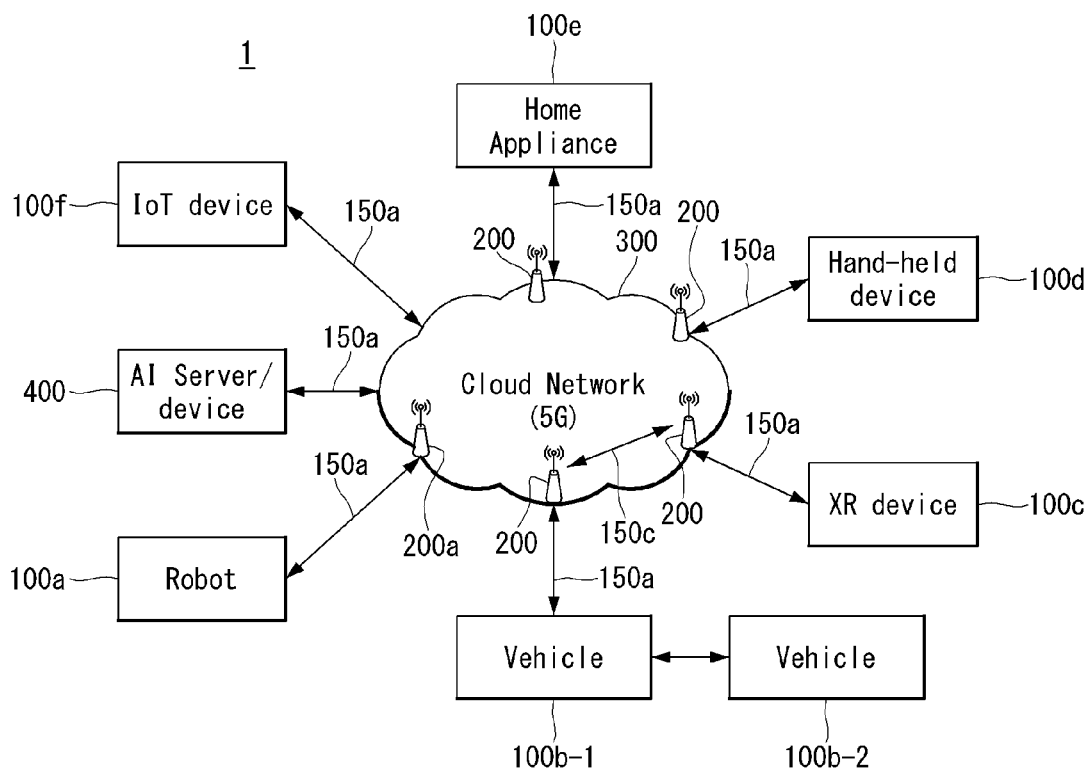

[FIG. 14]

[FIG. 15]
1000 (102/106, 202/206)
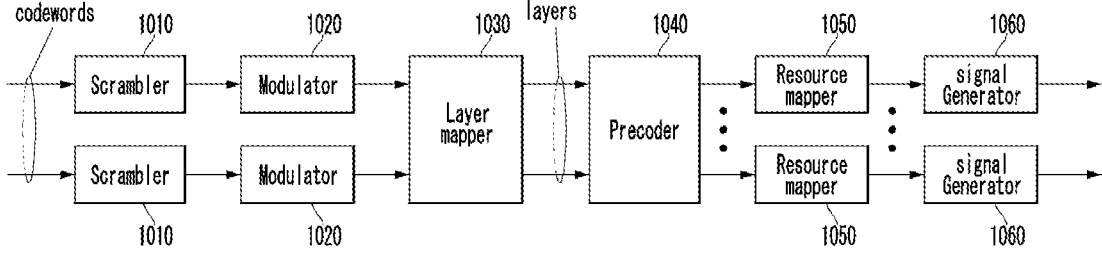

[FIG. 16]
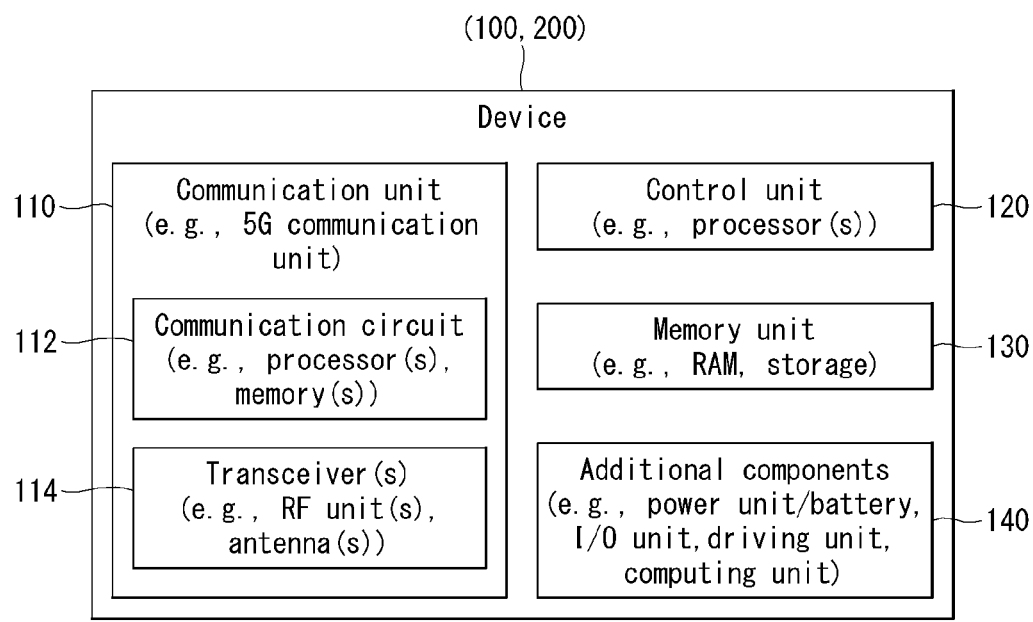

[FIG. 17]
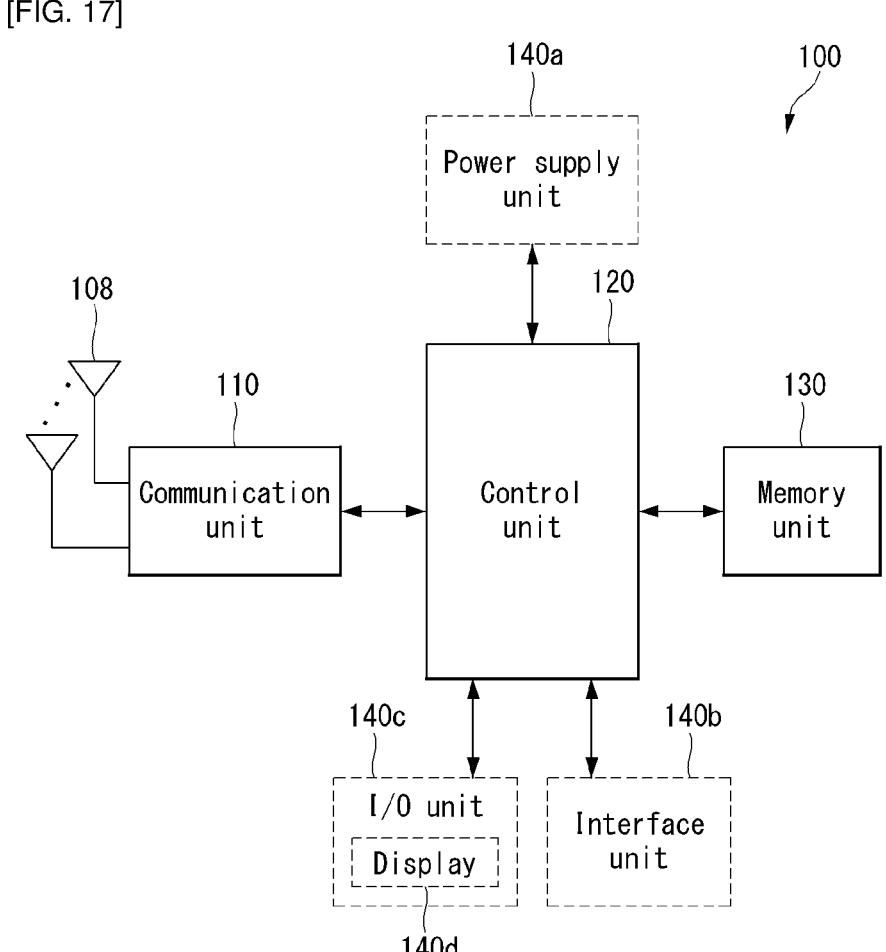

METHOD AND DEVICE FOR TRANSMITTING OR RECEIVING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2022/000120, filed on Jan. 5, 2022, which claims the benefit of KR Application No. 10-2021-0002893, filed on Jan. 8, 2021, No. 10-2021-0005597, filed on Jan. 14, 2021, and No. 10-2021-0104019, filed on Aug. 6, 2021, the contents of which are all hereby incorporated by reference herein in their entirety.

TECHNICAL FIELD

The present disclosure relates to a method and device for transmitting and receiving channel state information in a wireless communication system.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

According to the standardization discussion related to RAN1 Rel-17 M-TRP BM, the following operation/configuration may be considered for TRP-specific beam measurement/reporting.

For TRP-specific beam reporting, a combination of CMRs (DL RS or/and DL beams) that the UE may simultaneously receive from different TRPs needs to be reported. According to the existing method, a (Rel-15) group-based beam reporting operation may be utilized to report a CMR combination capable of simultaneous reception.

Based on the aforementioned group-based beam reporting operation, a terminal may report two simultaneously receivable channel measurement resources (CMRs) that can be simultaneously received. However, since the terminal checks and reports only that two CMRs may be simultaneously received, it is not determined whether the CMRs reported from the terminal's reporting are CMRs from S-TRPs or CMRs from different M-TRPs. That is, a problem arises in that beam reporting specific to TRP (beam reporting for the purpose of M-TRP) is not performed through the operation described above.

In order to solve the above problem, the following operation/setting is defined. CMRs in a specific reporting group reported by the terminal should include CMRs that can be simultaneously received, and if beam reporting for M-TRP is performed, the corresponding group may be set to include CMR pairs from different TRPs.

SUMMARY

According to an operation defined for the TRP-specific beam reporting, the terminal may report up to four pairs/group by measuring a (simultaneously receivable) CMR pair from each transmission and reception point (TRP). At this time, all pairs/groups reported by the terminal include a M-TRP beam pair. According to this operation, there is a constraint that only simultaneously receivable M-TRP beam pairs (up to 4 pairs) are reported in one beam reporting instance.

The present disclosure a method for solving the problem that a type of information reported through group-based beam reporting is limited to CMRs that can be simultaneously received from M-TRP as beam reporting for M-TRP is supported.

The technical objects of the present disclosure are not limited to the aforementioned technical objects, and other technical objects, which are not mentioned above, will be apparently appreciated by a person having ordinary skill in the art from the following description.

In an aspect, a method for reporting channel state information (CSI) by a terminal in a wireless communication system includes: receiving configuration information related to CSI; receiving a downlink reference signal (DL RS); calculating the CSI based on the DL RS; and reporting the CSI.

The CSI may be related to group-based beam reporting, and a specific criterion for reporting the CSI may be configured for each group based on the configuration information.

The CSI may include information on one or more DL RSs based on the specific criterion for each group.

The specific criterion may be related to whether the one or more DL RSs can be simultaneously received by the terminal.

The specific criterion may be related to whether the one or more DL RSs are associated with a single transmission and reception point (TRP) or a plurality of TRPs.

The specific criterion may be related to whether the one or more DL RSs can be received by a same panel or different panels.

The specific criterion may be related to whether the one or more DL RSs can be received based on synchronous reception or asynchronous reception.

Based on the one or more DL RSs determined from a plurality of DL RS resource sets, an order of the one or more DL RSs may be determined based on a DL RS resource set having a lowest index, among the plurality of DL RS resource sets.

A payload for each group of the CSI may include bit widths determined based on the plurality of DL RS resource sets, and each bit width may be determined based on a number of DL RS resources in each DL RS resource set.

The payload for each group of the CSI may be generated so that a bit width representing a DL RS determined from the DL RS resource set having the lowest index, among the one or more DL RSs, is located at a frontmost.

Based on that i) the one or more DL RSs are associated with the single TRP, and ii) the one or more DL RSs are determined from a plurality of DL RS resource sets, the one or more DL RSs may be based on a specific DL RS resource set, among the plurality of DL RS resource sets.

A payload for each group of the CSI may include a bit width determined based on the specific DL RS resource set, and the bit width may be determined based on a number of DL RS resources in the specific DL RS resource set.

Based on that i) the specific criterion is related to reception quality measured by the terminal without distinction of a TRP and ii) the one or more DL RSs are determined from a plurality of DL RS resource sets, an order of the one or more DL RSs may be determined based on a global RS index related to all DL RS resources included in the plurality of DL RS resource sets.

A payload for each group of the CSI may include bit widths determined based on the plurality of DL RS resource sets, and the bit widths may be arranged based on the order of the one or more DL RSs in the payload for each group of the CSI.

In another aspect, a terminal reporting channel state information (CSI) in a wireless communication system includes: one or more transceivers; one or more processors; and one or more memories operably connectable to the one or more processors and configured to store instructions set, when executed by the one or more processors, to allow the one or more processors to perform operations.

The operations may include receiving configuration information related to the channel state information (CSI); receiving a downlink reference signal (DL RS); calculating the CSI based on the DL RS; and reporting the CSI.

The CSI may be related to group-based beam reporting, and a specific criterion for reporting the CSI may be configured for each group based on the configuration information The CSI may include information on one or more DL RSs based on the specific criterion for each group.

In another aspect, a device includes one or more memories and one or more processors functionally connected to the one or more memories.

The one or more memories may include instructions set, when executed by the one or more processors, to allow the one or more processors to perform operations.

The operations may include: receiving configuration information related to channel state information (CSI); receiving a downlink reference signal (DL RS); calculating the CSI based on the DL RS; and reporting the CSI.

The CSI may be related to group-based beam reporting, and a specific criterion for reporting the CSI may be configured for each group based on the configuration information.

The CSI may include information on one or more DL RSs based on the specific criterion for each group.

One or more non-transitory computer-readable mediums may store one or more instructions.

One or more instructions executable by one or more processors may be set to allow the one or more processors to perform operations.

The operations may include: receiving configuration information related to channel state information (CSI); receiving a downlink reference signal (DL RS); calculating the CSI based on the DL RS; and reporting the CSI.

The CSI may be related to group-based beam reporting, and a specific criterion for reporting the CSI may be configured for each group based on the configuration information.

The CSI may include information on one or more DL RSs based on the specific criterion for each group.

In another aspect, a method for receiving channel state information (CSI) by a base station (BS) in a wireless communication system includes: transmitting configuration information related to the CSI; transmitting a downlink reference signal (DL RS); and receiving the CSI.

The CSI may be related to group-based beam reporting, and a specific criterion for reporting the CSI is configured for each group based on the configuration information.

The CSI may include information on one or more DL RSs based on the specific criterion for each group.

In another aspect, a base station (BS) receiving channel state information (CSI) in a wireless communication system may include: one or more transceivers; one or more processors; and one or more memories operably connectable to the one or more processors and configured to store instructions set, when executed by the one or more processors, to allow the one or more processors to perform operations.

The operations may include: transmitting configuration information related to the channel state information (CSI); transmitting a downlink reference signal (DL RS); calculating the CSI based on the DL RS; and receiving the CSI.

The CSI may be related to group-based beam reporting, and a specific criterion for reporting the CSI may be configured for each group based on the configuration information.

The CSI may include information on one or more DL RSs based on the specific criterion for each group.

According to an embodiment of the present disclosure, in a group-based beam reporting operation, one or more DL RSs based on a specific criterion set for each group are reported.

Therefore, even when group-based beam reporting is performed TRP-specifically by a terminal, a reported CMR (i.e., DL RS resource) is not limited to the CMR that can be simultaneously received by the TRP. In other words, even when group-based beam reporting is performed TRP-specifically, the terminal may report CMR(s) determined according to other criteria as well as CMR(s) that can be simultaneously received. In a group-based beam reporting operation supporting TRP-specific beam reporting, flexibility of an operation for configuring beam reporting information may be increased.

In addition, in the TRP-specific group-based beam reporting operation, other characteristics (same panel reception, synchronous reception, S-TRP or M-TRP) may be considered as well as whether simultaneous reception is possible by the terminal. Based on the corresponding beam reporting, DL scheduling of the base station may be performed more effectively. For example, the following DL scheduling may be performed. DL scheduling based on single/multiple panels may be performed based on panel selection. Based on TRP selection, S-TRP/M-TRP based DL scheduling may be performed. Based on TRP selection, M-TRP DL scheduling based on simultaneously receivable TRPs may be performed.

Effects which may be obtained by the present disclosure are not limited to the aforementioned effects, and other technical effects not described above may be evidently understood by a person having ordinary skill in the art to which the present disclosure pertains from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart illustrating an example of a CSI related procedure.

FIG. 11 is a flowchart illustrating a method for reporting channel state information by a terminal in a wireless communication system according to an embodiment of the present disclosure.

FIG. 12 is a flowchart illustrating a method for receiving channel state information by a base station in a wireless communication system according to another embodiment of the present disclosure.

FIG. 13 illustrates a communication system 1 applied to the present disclosure.

FIG. 14 illustrates wireless devices applicable to the present disclosure.

FIG. 15 illustrates a signal process circuit for a transmission signal.

FIG. 16 illustrates another example of a wireless device applied to the present disclosure.

FIG. 17 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology, such as universal terrestrial radio access (UTRA) or CDMA2000. The TDMA may be implemented by radio technology, such as global system for mobile communications (GSM)/general packet radio service (GPRS)/enhanced data rates for GSM evolution (EDGE). The OFDMA may be implemented as radio technology, such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LT 36.211: Physical channels and modulation
   36.212: Multiplexing and channel coding
   36.213: Physical layer procedures
   36.300: Overall description
   36.331: Radio Resource Control (RRC)

3GPP NR 38.211: Physical channels and modulation
   38.212: Multiplexing and channel coding
   38.213: Physical layer procedures for control 38.214: Physical layer procedures for data 38.300: NR and NG-RAN Overall Description 38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, $\mu$). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW)

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$. Downlink and uplink transmissions is constituted of a radio frame with a period of $T_f = (\Delta f_{max} N_f/100) \cdot T_s = 10$ ms. Here, the radio frame is constituted of 10 subframes each of which has a period of $T_{sf} = (\Delta f_{max} N_f/1000) \cdot T_s = 1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0 \ldots, N_{subframe}^{slots,\mu}-1\}$ in the subframe and in ascending order of $n_{s,f}^\mu \in \{0 \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_u^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{rmylot}^{subframe, \mu}$, of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{sc}^{RB}$ denotes a maximum transmission bandwidth and may change not only between numerologies but also between uplink and downlink.

Figure 5:
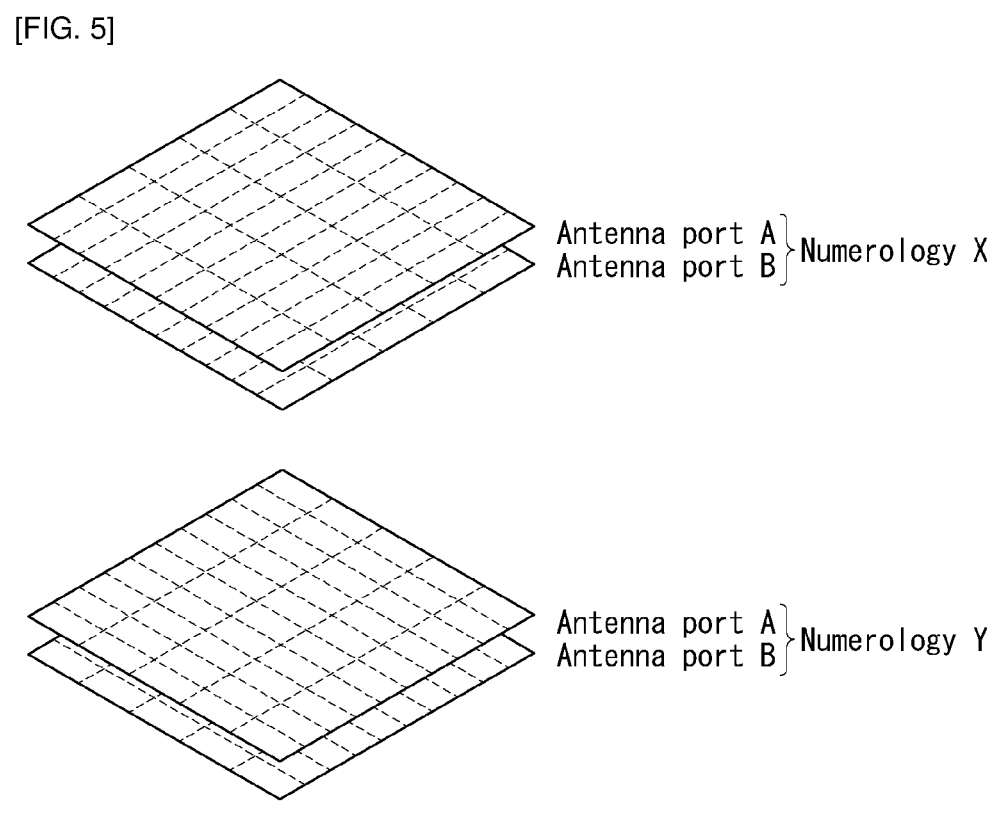

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, Ī) where k=0, . . . , $N_{RB}^\mu N_{sc}^{RB}-1$ is an index on a frequency domain, and l=0, . . . , $2^\mu N_{symb}^{(\mu)}-1$ refers to a location of a symbol in a subframe. The index pair (k, Ī) is used to refer to a resource element in a slot, where l=0, . . . , $N_{symb}^\mu-1$.

The resource element (k, Ī) for the numerology μ and the antenna port p corresponds to a complex value $a_{k,\bar{l}}^{(p,\mu)}$ When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is

11

No. Of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation, such as synchronizing with the eNB (S601). To this end, the UE may receive a Primary Synchronization Signal (PSS) and a (Secondary Synchronization Signal (SSS) from the eNB and synchronize with the eNB and acquire information, such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information, such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information, such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

Figure 7:
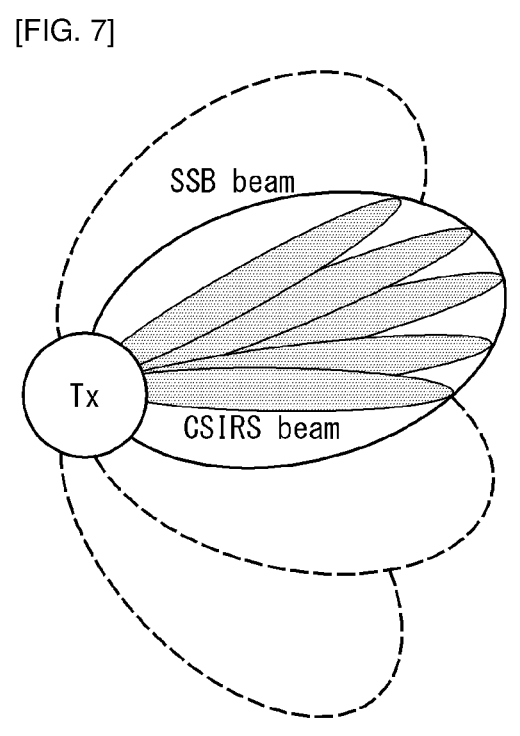

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Using SSB

Configuring beam report using an SSB is performed in CSI/beam configuration in an RRC connected state (or RRC connected mode).

The terminal receives a CSI-ResourceConfig IE including a CSI-SSB-ResourceSetList including SSB resources used for BM from the base station.

Table 5 shows an example of CSI-ResourceConfig IE, and as shown in Table 5, BM configuration using an SSB is not specifically defined and configures an SSB like a CSI-RS resource.

TABLE 5

```
ASN1START
TAG-CSI-RESOURCECONFIG-START
CSI-ResourceConfig ::=          SEQUENCE {
csi-ResourceConfigId          CSI-ResourceConfigId,
csi-RS-ResourceSetList          CHOICE {
nzp-CSI-RS-SSB          SEQUENCE {
nzp-CSI-RS-ResourceSetList          SEQUENCE (SIZE (1..maxNrofNZP-
CSI-RS-ResourceSetsPerConfig))  OF  NZP-CSI-RS-ResourceSetId
OPTIONAL,
csi-SSB-ResourceSetList          SEQUENCE (SIZE (1..maxNrofCSI-
SSB-ResourceSetsPerConfig)) OF CSI-SSB-ResourceSetId OPTIONAL
},
csi-IM-ResourceSetList          SEQUENCE (SIZE (1..maxNrofCSI-IM-
ResourceSetsPerConfig)) OF CSI-IM-ResourceSetId
},
bwp-Id          BWP-Id,
```

TABLE 5-continued

```
resource Type              ENUMERATED { aperiodic, semiPersistent,
periodic },
...
}
TAG-CSI-RESOURCECONFIGTOADDMOD-STOP
-- ASN1STOP
```

In Table 5, the csi-SSB-ResourceSetList parameter shows a list of an SSB resources that are used for beam management and reporting in one resource set. In this case, the SSB resource set may be set as {SSBx1, SSBx2, SSBx3, SSBx4, . . . }. The SSB index may be defined from 0 to 63.

The terminal receives the SSB resource from the base station based on the CSI-SSB-ResourceSetList.

When the CSI-RS reportConfig related to reporting on SSBRI and L1-RSRP is configured, the terminal reports best SSBRI and L1-RSRP corresponding thereto to the base station.

That is, when reportQuantity of the CSI-RS reportConfig IE is configured as 'ssb-Index-RSRP', the terminal reports best SSBRI and corresponding L1-RSRP to the base station.

Further, when a CSI-RS resource is configured and 'QCL-TypeD' may be applied in OFDM symbol(s) the same as the SSB (SS/PBCH Block), the terminal may assume the CSI-RS and SSB as being quasi co-located in terms of the 'QCL-TypeD'.

In this case, the QCL TypeD may mean there is QCL between antenna ports in terms of the spatial Rx parameter. When the terminal receives a plurality of DL antenna ports that are in the QCL Type D relationship, the same reception beam may be applied. Further, the terminal does not expect that CSI-RS is configured in an RE overlapping the RE of the SSB.

DL BM Using CSI-RS

Described the use of CSI-RS, i) a repetition parameter is configured in a specific CSI-RS resource set, and when TRS_info is not configured, the CSI-RS is used for beam management. ii) When a repetition parameter is not configured and TRS_info is configured, the CSI-RS is used for a TRS (tracking reference signal). iii) When a repetition parameter is not configured and TRS_info is not configured, the CSI-RS is used for CSI acquisition.

A process of determining a reception beam of a UE using CSI may be performed as follows.

A terminal receives NZP CSI-RS resource set IE including higher layer parameter repetition from a base station through RRC signaling. In this case, the repetition parameter is configured as 'ON'.

The terminal repeatedly receive resource(s) in CSI-RS resource set in which repetition is configured as 'ON' at different OFDM symbols through the same Tx beam (or DL spatial domain transmission filter) of a base station.

The terminal determines its RX beam.

The terminal omits CSI report. In this case, reportQuantity of CSI report config may be configured as 'No report(or None)'.

That is, the terminal may omit CSI report when repetition is configured as 'ON'.

A process of determining a transmission beam of a base station using CSI may be performed as follows.

A terminal receives NZP CSI-RS resource set IE including higher layer parameter repetition from a base station through RRC signaling. In this case, the repetition parameter is configured as 'OFF' and it is associated with Tx beam sweeping of the base station.

The terminal receives resources in a CSI-RS resource set in which repetition is configured as 'OFF' through different Tx beams (DL spatial domain transmission filters) of the base station.

The terminal selects (or determines) a best beam.

The terminal reports ID and related quality information on the selected beam (e.g., L1-RSRP) to the base station. In this case, reportQuantity of CSI report config may be configured as 'CRI+L1-RSRP'.

That is, the terminal reports CRI and corresponding L1-RSRP to the base station when CSI-RS is transmitted for BM.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types, such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 6 represents an example of TCI-State IE.

The TCI-State IE associates one or two DL reference signals (RSs) with corresponding quasi co-location (QCL) types.

TABLE 6

```
-- ASN1START
-- TAG-TCI-STATE-START
TCI-State ::=              SEQUENCE {
  tci-StateId                 TCI-StateId,
  qcl-Type1                   QCL-Info,
  qcl-Type2                   QCL-Info
  ...
}
QCL-Info ::=              SEQUENCE {
  cell                        ServCellIndex
  bwp-Id                      BWP-Id
  referenceSignal             CHOICE {
    csi-rs                      NZP-CSI-RS-ResourceId,
    ssb                         SSB-Index
  },
  qcl-Type                    ENUMERATED {typeA, typeB, typeC,
                              typeD},
  ...
}
-- TAG-TCI-STATE-STOP
-- ASN1STOP
```

In Table 6, bwp-Id parameter represents a DL BWP where the RS is located, cell parameter represents a carrier where the RS is located, and reference signal parameter represents reference antenna port(s) which is a source of quasi colocation for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL).

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter, such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 7 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 7

```
-- ASN1START
-- TAG-MAC-CELL-GROUP-CONFIG-START
SRS-Config ::=                         SEQUENCE {
    srs-ResourceSetToReleaseList            SEQUENCE (SIZE(1..maxNrofSRS-
ResourceSets)) OF SRS-ResourceSetId         OPTIONAL,  -- Need N
    srs-ResourceSet ToAddModList            SEQUENCE (SIZE(1..maxNrofSRS-
ResourceSets)) OF SRS-ResourceSet              OPTIONAL,  -- Need N
    srs-ResourceToReleaseList               SEQUENCE (SIZE(1..maxNrofSRS-
Resources)) OF SRS-ResourceId               OPTIONAL, -- Need N
    srs-ResourceToAddModList                SEQUENCE (SIZE(1..maxNrofSRS-
Resources)) OF SRS-Resource                 OPTIONAL,  -- Need N
    tpc-Accumulation                        ENUMERATED {disabled}
    ...
}
SRS-ResourceSet ::=                    SEQUENCE {
    srs-ResourceSetId                       SRS-ResourceSetId,
```

TABLE 7-continued

```
srs-ResourceIdList                    SEQUENCE (SIZE(1..maxNrofSRS-
ResourcesPerSet)) OF SRS-ResourceId   OPTIONAL, -- Cond Setup
  resourceType                    CHOICE {
    aperiodic                         SEQUENCE {
      aperiodicSRS-ResourceTrigger              INTEGER (1..maxNrofSRS-
TriggerStates-1),
      csi-RS                          NZP-CSI-RS-ResourceId
      slotOffset                      INTEGER (1..32)
      ...
    },
    semi-persistent                   SEQUENCE {
      associatedCSI-RS                          NZP-CSI-RS-ResourceId
      ...
    },
    periodic                          SEQUENCE {
      associatedCSI-RS                          NZP-CSI-RS-ResourceId
      ...
    }
  },
  usage                           ENUMERATED {beamManagement,
codebook, nonCodebook, antennaSwitching},
  alpha                           Alpha
  p0                              INTEGER (-202..24)
  pathlossReferenceRS             CHOICE {
    ssb-Index                     SSB-Index,
    csi-RS-Index                  NZP-CSI-RS-ResourceId
SRS-SpatialRelationInfo ::=     SEQUENCE {
  servingCellId                   ServCellIndex
  referenceSignal                 CHOICE {
    ssb-Index                     SSB-Index,
    csi-RS-Index                  NZP-CSI-RS-ResourceId,
    srs                               SEQUENCE {
      resourceId                            SRS-ResourceId,
      uplinkBWP                             BWP-Id
    }
  }
}
}
SRS-ResourceId ::=              INTEGER (0..maxNrofSRS-Resources-1)
```

In Table 7, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

Hereinafter, a CSI related procedure will be described.

FIG. 10 is a flowchart illustrating an example of a CSI related procedure.

Referring to FIG. 10, in order to perform one of usages of the CSI-RS, a terminal (e.g., user equipment (UE)) receives, from a base station (e.g., general Node B or gNB), configuration information related to the CSI through radio resource control (RRC) signaling (S1010).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 8 shows an example of NZP CSI-RS resource set IE. Referring to Table 8, parameters (e.g., a BM related 'repetition' parameter and a tracking related 'trs-Info' parameter) representing the usage may be configured for each NZP CSI-RS resource set.

TABLE 8

```
-- ASN1START
-- TAG-NZP-CSI-RS-RESOURCESET-START
NZP-CSI-RS-ResourceSet ::=  SEQUENCE {
    nzp-CSI-ResourceSetId           NZP-CSI-RS-ResourceSetId,
    nzp-CSI-RS-Resources            SEQUENCE (SIZE(1..maxNrofNZP-CSI-RS-
ResourcesPerSet)) OF NZP-CSI-RS-ResourceId,
    repetition                      ENUMERATED { on, off }
    aperiodicTriggeringOffset       INTEGER(0..4)
    trs-Info                        ENUMERATED {true}
    ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 9 below shows an example of CSI-ReportConfig IE.

TABLE 9

```
-- ASN1START
-- TAG-CSI-RESOURCECONFIG-START
CSI-ReportConfiq ::=   SEQUENCE {
    reportConfigId                      CSI-ReportConfigId,
    carrier                             ServCellIndex           OPTIONAL, -
- Need S
    resourcesForChannelMeasurement      CSI-ResourceConfigId,
    csi-IM-ResourcesForInterference     CSI-ResourceConfigId  OPTIONAL, -
- Need R
    nzp-CSI-RS-ResourcesForInterference CSI-ResourceConfigId  OPTIONAL, -
- Need R
    reportConfigType                    CHOTCE {
        periodic                            SEQUENCE {
            reportSlotConfig                    CSI-
ReportPeriodicicyAndOffset,
            pucch-CSI-ResourceList                  SEQUENCE (SIZE
(1..maxNrofBWPs)) OF PUCCH-CSI-Resource
        },
        semiPersistentOnPUCCH               SEQUENCE {
            reportSlotConfig                    CSI-
ReportPeriodicityAndOffset,
            pucch-CSI-ResourceList                  SEQUENCE (SIZE
```

TABLE 9-continued

```
(1..maxNrofBWPs)) OF PUCCH-CSI-Resource
      },
         semiPersistentOnPUSCH           SEQUENCE {
            reportSlotConfig                ENUMERATED {s15, s110, s120,
s140, s180, s1160, s1320},
            reportslotOffsetList          SEQUENCE (SIZE (1.. maxNrofUL-
Allocations)) OF INTEGER(0..32),
            p0alpha                         P0-PUSCH-AlphaSetId
         },
         aperiodic                       SEQUENCE {
            reportSlotOffsetList          SEQUENCE (SIZE (1..maxNrofUL-
Allocations)) OF INTEGER(0..32)
         }
      },
      reportQuantity                   CHOICE {
         none                            NULL,
         cri-RI-PMI-CQI                  NULL,
         cri-RI-i1                       NULL,
         cri-RI-i1-CQI                   SEQUENCE {
            pdsch-BundleSizeForCSI          ENUMERATED {n2, n4}
OPTIONAL
         },
         cri-RI-CQI                      NULL,
         cri-RSRP                        NULL,
         ssb-Index-RSRP                  NULL,
         cri-RI-LI-PMI-CQI               NULL
      },
```

The UE measures CSI based on configuration information related to the CSI (S1020). The CSI measurement may include (1) a CSI-RS reception process of the UE (S1021) and (2) a process of computing the CSI through the received CSI-RS (S1022), and a detailed description thereof will be made below.

For the CSI-RS, resource element (RE) mapping is configured time and frequency domains by higher layer parameter CSI-RS-ResourceMapping.

Table 10 shows an example of CSI-RS-ResourceMapping IE.

Here, when a quantity of CSI-ReportConfig of Table 9 is configured to 'none (or No report)', the UE may skip the report.

However, even when the quantity is configured to 'none (or No report)', the UE may report the measured CSI to the BS.

The case where the quantity is configured to 'none (or No report)' is a case of triggering aperiodic TRS or a case where repetition is configured.

Here, only in a case where the repetition is configured to 'ON', the report of the UE may be omitted.

TABLE 10

```
   -- ASN1START
-- TAG-CSI-RS-RESOURCEMAPPING-START
CSI-RS-ResourceMapping ::=          SEQUENCE {
   frequencyDomainAllocation         CHOICE {
      row1                             BIT STRING (SIZE (4)),
      row2                             BIT STRING (SIZE (12)),
      row4                             BIT STRING (SIZE (3)),
      other                            BIT STRING (SIZE (6))
   },
   nrofPorts                         ENUMERATED {p1,p2,p4,p8,p12,p16,p24,p32},
   firstOFDMSymbolInTimeDomain       INTEGER (0..13),
   firstOFDMSymbolInTimeDomain2      INTEGER (2..12)
   cdm-Type                          ENUMERATED {noCDM, fd-CDM2, cdm4-FD2-TD2, cdm8-
FD2-TD4},
   density                           CHOICE {
      dot5                             ENUMERATED {everPRBs, oddPRBs},
      one                              NULL,
      three                            NULL,
      spare                            NULL
   },
   freqBand                          CSI-FrequencyOccupation,
   ...
}
```

In Table 10, a density (D) represents a density of the CSI-RS resource measured in RE/port/physical resource block (PRB) and nrofPorts represents the number of antenna ports.

The UE reports the measured CSI to the BS (S1030).

Resource Setting

Each CSI resource setting 'CSI-ResourceConfig' includes configuration for $S \geq 1$ CSI resource set (given by higher layer parameter csi-RS-ResourceSetList). The CSI resource setting corresponds to CSI-RS-resourcesetlist. In this case, S is the number of configured CSI-RS resource sets. Here, the list of S≥−1 CSI resource sets includes either or both of the NZP CSI-RS resource set (s) and the SS/PBCH block (SSB) set (s) used for L1-RSRP computation, or includes the CSI-IM resource set(s).

Each CSI resource setting is positioned at a DL BWP (bandwidth part) identified by a higher layer parameter bwp-id. Further, all CSI resource settings linked to the CSI reporting setting have the same DL BWP.

The time domain behavior of a CSI-RS resource in the CSI resource setting included in the CSI-ResourceConfig IE is indicated by higher layer parameter resourceType and may be configured to be aperiodic, periodic, or semi-persistent. The number (S) of configured CSI-RS resource sets are limited to '1' for periodic and semi-persistent CSI resource settings. For periodic and semi-persistent CSI resource settings, the configured periodicity and slot offset are given by numerology of an associated DL BWP as being given by a bwp-id.

When a UE is configured by several CSI-ResourceConfigs including the same NZP CSI-RS resource ID, the same time domain behavior is configured for the CSI-ResourceConfig.

When a UE is configured by several CSI-ResourceConfigs including the same CSI-IM resource ID, the same time domain behavior is configured for the CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, a CMR (channel measurement resource) may be an NZP CSI-RS for CSI acquisition and an IMR (Interference measurement resource) may be an NZP CSI-RS for CSI-IM and IM.

In this case, the CSI-IM (or ZP CSI-RS for IM) is generally used for inter-cell interference measurement.

Further, the NZP CSI-RS for IM is generally used for intra-cell interference measurement from multi-users.

The UE may assume that a CSI-RS resource(s) for channel measurement and a CSI-IM/NZP CSI-RS resource(s) for interference measurement configured for one CSI reporting are 'QCL-TypeD' for each resource.

As described above, resource setting may mean a resource set list.

For an aperiodic CSI, each trigger state configured using higher layer parameter CSI-AperiodicTriggerState is associated with one or several CSI-ReportConfigs in which each CSI-ReportConfig is linked to periodic, semi-persistent, or aperiodic resource setting.

One reporting setting may be connected to maximally three resource settings.

When one resource setting is configured, resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for interference measurement that is performed on a CSI-IM or an NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

Each CSI-ReportConfig is linked to periodic or semi-persistent resource setting for a Semi-persistent or periodic CSI.

When one resource setting (given by esourcesForChannelMeasurement) is configured, the resource setting is about channel measurement for L1-RSRP computation.

When two resource settings are configured, the first resource setting (given by esourcesForChannelMeasurement) is for channel measurement and the second resource setting (given by higher layer parameter csi-IM-ResourcesForInterference) is for interference measurement that is performed on a CSI-IM.

The contents of the foregoing may be applied in combination with the methods proposed in this specification, which will be described later, or may be supplemented to clarify the technical characteristics of the methods proposed in this specification. The methods described below are only classified for convenience of explanation, and some components of one method may be substituted with some components of another method or may be applied in combination with each other.

In NR Rel-15/Rel-16, a CSI/beam measurement and/or CSI/beam reporting procedure of a terminal is defined for CSI reporting (or beam reporting) operation between a base station and the terminal.

Channel state information (CSI) may include information related to beam reporting (e.g., DL RS resource index (CRI, SSBRI), L1-RSRP, L1-SINR). However, in the present disclosure, when CSI reporting and beam reporting are separately referred to, information reported according to a CSI reporting operation may be interpreted as meaning information excluding beam reporting related information from information that may be included in the CSI.

For CSI/L1-RSRP/L1-SINR measurement of DL RS (CSI-RS/SSB), specific CSI-RS resource set(s) or/and CSI-SSB resource set(s) may be configured in the terminal. The CSI-RS resource set(s) or/and CSI-SSB resource set(s) may be configured/connected within a specific CSI resource setting (RRC IE CSI-ResourceConfig). Also, the CSI resource setting is set/connected/associated with a specific CSI reporting setting (RRC IE CSI-ReportConfig). Based on this, CSI-related quantities, L1-RSRP-related quantities, or L1-SINR-related quantities may be reported by the terminal according to the reportQuantity of the corresponding CSI reporting setting.

The CSI/beam measurement and reporting operation described above is an operation mainly used in S-TRP transmission and reception, and the CSI/beam reporting operation for M-TRP transmission and reception needs to be supported.

In particular, in the Rel-17 NR FeMIMO standardization, it was agreed to proceed with beam reporting enhancement for simultaneous M-TRP transmission with multi-panel reception. For simultaneous M-TRP transmission with multi-panel reception between the base station and the terminal, the terminal needs to report to the base station a combination of CMRs (DL RS or/and DL beam) that can be simultaneously received from different TRPs.

Rel-15 group-based beam reporting exists as a beam reporting method that has such a simultaneous receivable CMR combination report function. In the case of the Rel-15 group-based beam reporting, when the groupBasedBeam- Reporting parameter in each CSI-ReportConfig is 'enabled', two CMRs that can be simultaneously received are reported during beam reporting through the corresponding CSI-ReportConfig.

However, from two simultaneously receivable CMRs reported through group-based beam reporting, it cannot be determined whether the corresponding CMRs are CMRs from the S-TRP or CMRs from the M-TRP. This is because, when measuring the corresponding CMRs, the terminal reports the CMRs determined based only on whether simultaneous reception is possible without checking whether the CMRs are from the S-TRP or from different M-TRPs.

There is a problem in that, through the aforementioned group-based beam reporting, the best simultaneously receivable CMR pair is only reported and beam reporting for the purpose of M-TRP is not always performed.

Hereinafter, methods for solving the above problems will be described.

Table 11 below summarizes agreements related to M-TRP beam measurement and reporting.

TABLE 11

@RAN1 #102e
Agreement
For L1-RSRP, consider measurement/reporting enhancement to
facilitate inter-TRP beam pairing
    Option-1: Group-based reporting,
      e.g., beam restriction to facilitate inter-TRP pairing.
    Option-2: Non-group-based reporting
Agreement
    Evaluate and study at least but not limited to the following issues for
multi-beam enhancement
    Issue 1: Consideration of inter-beam interference
    Issue 2: For group-based reporting, increased number of groups
and/or beams per group
    Issue 3: UE Rx panel related beam measurement/report
      NOTE: "UE panel" is used for discussion purpose only
    @RAN1 #103e
    Agreement
    Down-select at least one of the following options for
beam measurement/reporting enhancement to facilitate inter-TRP beam
pairing in RAN1 #104-e
    Option 1: In a CSI-report, UE may report N>1 pair/groups
and M>=1 beams per pair/group
      Different beams in different pairs/groups may be received
simultaneously
      FFS: whether M is equal or may be different across different
pair/group
    Option 2: In a CSI-report, UE may report N(N>=1) pairs/groups and
M (M>1) beams per pair/group
      Different beams within a pair/group may be received
      simultaneously
    Option 3: UE report M(M>=1) beams in N (N>1) CSI-
reports corresponding to N report setting
      Different beams in different CSI-reports may be received
simultaneously
      FFS: whether/how to introduce an association between different
CSI-reports
      FFS: whether/how to differentiate reported measurements for
beams that are received simultaneously vs. Beams that are not received
simultaneously
        Whether/how to introduce an indication along with the CSI-
reports to indicate whether the beams in different CSI-reports may be
received simultaneously
      FFS: value of N and M in each option
      FFS: Association between different beams in above options and
different TRP/UE panels
      FFS: Identify new use cases per option compared with R16 (includ-
ing
backhaul)
      FFS: whether different beams in different pairs/groups/reports may be
received by same spatial filter per option In the Rel-17 NR FeMIMO standardization, the contents of Option 1 to Option 3 were discussed as a beam reporting enhancement method for simultaneous M-TRP transmission with multi-panel reception as described above.

Option 1 and Option 2 are enhancement methods based on group-based beam reporting, and Option 3 is an enhancement method based on non-group-based beam reporting.

According to Option 1, the following operations/settings are performed.

CMRs from different reporting groups reported by the terminal include CMRs that can be simultaneously received. If beam reporting for M-TRP is performed, a specific group may refer to a specific TRP (different groups mean different TRPs). That is, it can be interpreted that, during beam reporting operation for M-TRP, each group corresponds to each TRP.

According to Option 2, the following operations/settings are performed.

CMRs within a specific reporting group reported by the UE (or terminal) include CMRs that can be simultaneously received. If beam reporting for M-TRP is performed, the group may include CMR pairs from different TRPs. When N groups are reported, it may mean that N best pairs (i.e., best beam pairs) are reported.

According to Option 3, the following operations/settings are performed.

This method is performed targeting a specific scenario (mainly, a non-ideal backhaul scenario). According to the corresponding method, different reporting settings may be connected/associated. CMRs reported from different report settings (CSI-ReportConfig IE) may be CMRs that can be simultaneously received or CMRs that cannot be simultaneously received (different CSI-ReportConfigs mean different TRPs). That is, CSI-ReportConfig, which is a parameter indicating reporting setting, may be interpreted as corresponding to TRP. Accordingly, each of a plurality of reporting settings (CSI-ReportConfig) may correspond to each TRP among a plurality of TRPs.

Even in terms of beam measurement performed before beam reporting of the UE, TRP differentiation that from which TRPs the CMRs configured by the base station are is a part that should be preceded, but in this specification, a beam reporting method of a UE for TRP transmission and reception is mainly proposed.

Based on the above background, the present disclosure proposes a method for measuring and reporting a beam of a UE for M-TRP downlink transmission of a base station and related operations (embodiments).

In the present disclosure, '/' may be interpreted as 'and', 'or', or 'and/or' depending on the context.

In proposals 1 to 3 below, methods that may be applied to at least one of candidate options (Options 1 to 3) for beam reporting enhancement for simultaneous M-TRP transmission with multi-panel reception are disclosed. For convenience of description in the embodiments to be described later, a description is given based on the assumption of a specific option (e.g., Option 2) among Options 1 to 3. This does not necessarily mean that the application of the embodiment is limited to the specific option, and each embodiment may be applied to other option(s) as well.

[Proposal 1]

In relation to Option 2 (improvement method based on group-based beam reporting), a concept of group quantity may be defined/set for each reporting group. Based on the group quantity, the following operations may be considered.

In group-based beam reporting, a base station may configure information representing the type/characteristics of reported information (report target) as a group quantity.

A terminal may additionally report information representing the type/characteristic of the reported information (in addition to the type/characteristic set by the base station) as a group quantity according to the group-based beam reporting operation.

The term group quantity is a term defined for convenience of description, and the technical concept according to the present embodiment is not intended to be limited to the term group quantity. That is, the group quantity may be interpreted as a parameter/concept/information indicating/limiting a reported target (type/characteristic of reported information) when reporting a group-based beam. Here, the reported target may refer to CMR(s) reported by the UE (i.e., the terminal).

Hereinafter, the expression that the group quantity includes/indicates specific information may be interpreted as follows.

i) Configure the group quantity to report target(s) based on specific criteria (e.g. type/characteristics);

ii) Limiting/setting the reported target for group-based beam reporting operation to reported target(s) based on specific criteria The UE may report M CMRs within a group according to the group quantity definition/configuration of the corresponding group in the reporting group. Or/and, the terminal may additionally report the group quantity for each group in reporting for each group in beam reporting.

The group quantity is information on CMRs in a reporting group reported by the UE based on Option 2, and may include at least one of the following i) or ii).

i) Information on whether CMRs (e.g., M CMRs) are CMRs that can be simultaneously received or not ii) Information on whether the CMRs in the group are CMRs from S-TRP or CMRs from M-TRP For example, group quantity may be set to include/indicate information on at least one of the following 1) to 4).

1) Configuration of CMR combinations from S-TRPs that cannot be simultaneously received (or has no restriction on simultaneous reception)

2) Configuration of CMR combinations from S-TRPs that can be simultaneously received 3) Configuration a CMR combination from an M-TRP that cannot be simultaneously received (or has no restrictions on simultaneous reception)

4) Configuration of CMR combinations from M-TRPs that can be simultaneously received Specifically, when the terminal performs group-based beam reporting (Rel-17 group based beam reporting), the following operation may be assumed.

The group quantity defined/configured in a specific reporting group may be set to report CMRs that can be simultaneously received from the M-TRP by the UE (that is, the group quantity is set to CMRs that can be simultaneously received from the M-TRP). Accordingly, when reporting M CMR combinations through a corresponding group, the UE may need to perform group-based reporting with CMR combinations that can be simultaneously received from different TRPs. Or/and, in group-based beam reporting, the terminal may also need to report the group quantity information as described above.

Additionally, as another example of the group quantity, information on whether the UE receives CMRs in the reporting group through the same Rx panel or through different Rx panels may be included. For example, the group quantity may be set to CMRs received through the same Rx panel or CMRs received through different Rx panels.

For example, in the terminal (Option 2 based) beam reporting operation by setting/instruction of the base station, when the corresponding terminal reports 2 groups and 2 beams within a group are reported for each group, the following groups may be assumed.

Group 1 may be a CMR combination configuration in which group quantities may be simultaneously received regardless of S-TRP/M-TRP classification, and group 2 may be a CMR combination configuration from M-TRP in which group quantities may be simultaneously received. At this time, it may be assumed that CMRs 1, 2, 3, and 4 are set in the UE reporting the corresponding groups, CMRs 1 and 2 are transmitted by TRP1, and CMRs 3 and 4 are transmitted by TRP 2. The UE may report group 1/2 as follows.

For example, the UE may report CMR 1 and 2 through group 1. That is, among CMRs 1, 2, 3, and 4, the UE may report the best combination among combinations that can be simultaneously received without distinction of S-TRP/M-TRP.

For example, the UE may report CMRs 2 and 3 through group 2. That is, the terminal may search for a CMR combination that can be simultaneously received from TRP1 and TRP 2, determine one CMR (one of CMRs 1 and 2) for TRP 1, and determine one CMR (one of CMRs 3 and 4) for TRP 2.

The CMR combinations reported through group 1 and group 2 may be the same or different. For example, since group 1 has no TRP-related restrictions (S-TRP or M-TRP), it may be determined identically to the CMR combination reported through group 2. For example, there may be both a CMR combination (combination 1) that can be simultaneously received from the S-TRP and a CMR combination (combination 2) that can be simultaneously received from the M-TRP. Through group 1, combination 1 with better quality may be reported. In this case, the CMR combination reported through group 1 is different from the CMR combination reported through group 2.

If the CMR combinations reported through group 1 and group 2 are different, the CMR combination of group 1 may be a combination from S-TRP. After receiving the report, the base station may perform scheduling by selecting whether to perform S-TRP transmission (through beams of CMR 1 and/or 2) corresponding to group 1 or whether to perform M-TRP (through beams of CMR 2 and 3) transmission corresponding to group 2. That is, through the report of group 1, the base station may select TRP (S-TRP or M-TRP) during DL scheduling.

Meanwhile, if the CMR combinations reported through group 1 and group 2 are the same, the base station may determine that the M-TRP best beam combination is the best. The base station may perform DL scheduling based on M-TRP.

Alternatively, in the above example, group 3 (or 4) may be added. Group 3 may be defined to report beams that can be simultaneously received by the same Rx panel (or another Rx panel). That is, group quantity of group 3 may be set to CMRs (or beams) simultaneously received through the same Rx panel or CMRs (or beams) simultaneously received through different Rx panels.

The corresponding definition of the group quantity may be fixed per group (index) or may be set (via RRC/MAC CE)/instructed (via DCI) by the base station. Alternatively, the UE may determine the quantity of each group during group-based reporting and report additionally together with beam reporting.

As another example, in the terminal (Option 2 based) beam reporting operation by setting/instruction to the base station, when the corresponding terminal reports two groups but two beams (2 beams within a group) are reported for each group, the following groups may be assumed.

Group 1 may be a CMR combination configuration in which group quantities may be simultaneously received without distinction of S-TRP/M-TRP, and group 2 may be a CMR combination configuration in which group quantities cannot be simultaneously received without distinction of S-TRP/M-TRP (or there is no restriction on simultaneous reception). The UE may report group 1/2 as follows.

The UE may need to report only CMR combinations that can be simultaneously received in group 1, and may need to report preferred CMRs in group 2 without restrictions on simultaneous reception. That is, the terminal may perform group-based beam reporting for group 1 and non-group-based beam reporting for group 2. Through the above configuration, the terminal may perform both group-based beam reporting and non-group-based beam reporting.

As another example of the second embodiment, the UE may report three CMRs in a specific beam report (or/and a specific reporting group) but operate as follows.

The terminal may select the best CMR (CMR0) and the second best CMR (CMR1) regardless of simultaneous reception, and select one more CMR (CMR2) that can be simultaneously received with the best CMR and report it.

The CMR1 and CMR2 may be the same CSI-RS/SSB. If the CMR (e.g., CMR2) that can be simultaneously received with the best CMR is the second best CMR (e.g., CMR1), the terminal may operate based on at least one of the following a) to c) when configuring payload of report contents.

a) Repeatedly transmit the same RS ID (e.g. CRI/SSB-RI)

b) Omit CMR2 and CMR 2 related L1-RSRP/SINR c) Configure UCI by filling the CMR2 and CMR2-related L1-RSRP/SINR with a prescribed value (e.g., all zero)

The following effects are derived through the group quantity definition/configuration or/and reporting of the proposal 1 above.

Group-based beam reporting of the UE may support M-TRP specific beam reporting.

In addition, in the existing group-based beam reporting (Rel-15 group-based reporting), the problem in which the base station could not check the properties of the CMRs in the reporting group (e.g., whether the CMR is from S-TRP/ CMR from M-TRP) may be solved Proposal 1 may also be applied to other options (e.g., Option 1) among beam reporting enhancement candidate options.

For example, in the case of Option 1, each group includes CMRs from each TRP. Therefore, a similar concept/definition may be used instead of the aforementioned group quantity concept. Specifically, CMRs based on the n-th CMR in each group may be CMRs determined based on a concept similar to the group quantity. The base station may define/configure the terminal to perform the above operation.

A concept similar to the group quantity may be set to include/indicate at least one of the following 1) to 6).

1) Configuration of CMR combinations from S-TRPs that cannot be simultaneously received 2) Configuration of CMR combinations from S-TRPs that can be simultaneously received 3) Configuration of CMR combinations from M-TRPs that cannot be simultaneously received 4) Configuration of CMR combinations from M-TRPs that can be simultaneously received 5) Configuration of CMR combinations received through the same Rx panel 6) Configuration of CMR combinations received through different Rx panels Or/and, the terminal may additionally report information on the n-th CMRs in each group together with beam reporting during group-based reporting. That is, the concept of CMR/beam quantity for the n-th CMR in each group may be introduced.

Additionally, when considering multi-TRP transmission introduced in Rel-16/17, RX timing (RXT) may have different values for each TRP-UE. For example, RXT1 may be requested for TRP1-UE and RXT2 may be requested for TRP2-UE. RXT1 and RXT2 may have different values. For example, when a difference in distance between TRP-UEs is large (i.e., when a difference between the distance between TRP1-UE and the distance between TRP2-UE is large), a difference in RXT values may occur. As described above, when the difference between RXT1 and RXT2 increases, multi-TRP transmission performance may deteriorate.

For example, when the difference between RXT1 and RXT2 increases to a cyclic prefix (CP) length or more, it may be expected that a large performance degradation occurs due to inter symbol interference (ISI) between two signals.

A method for solving the above problems will be described below.

According to an embodiment, information on whether the terminal reports a CMR combination having the same/ similar RXT for the CMRs in the reporting group in the group quantity (e.g., synchronous Rx) or reports a CMR combination with a large difference (e.g., asynchronous Rx) may be included.

In other words, the group quantity may be configured to include/indicate a combination of CMRs that can be simultaneously received (e.g., CMRs received based on synchronous RX) or a combination of CMRs that cannot be simultaneously received (e.g., CMRs received based on asynchronous RX).

In the above proposal, the 'RXT difference' may mean a difference in reception timing between the two CMRs expressed in msec units or symbol/slot level offset (from the point of view of the terminal).

Each CMR combination in the above example may be defined as follows.

A CMR combination having the same/similar RXT may mean a CMR combination having an RXT offset value within a certain threshold. For example, the CMR combination having the same/similar RXT may mean a CMR combination in which the largest value among difference values between RXTs according to CMRs included in the CMR combination is equal to or less than the predetermined threshold.

A CMR combination with a large RXT difference may mean a CMR combination having an RXT offset value outside a predetermined threshold. For example, a CMR combination having a large difference in RXTs may refer to a CMR combination in which a smallest value among difference values between RXTs according to CMRs included in the CMR combination is larger than the predetermined threshold.

The base station may perform DL scheduling on a subsequent corresponding terminal in consideration of the synchronous/asynchronous transmission environment between TRPs through the additional reporting criterion (group quantity) set in the terminal (reported by the terminal). For example, M-TRP based DL scheduling may be performed such that a TRP having a larger difference in RXT than other TRPs among a plurality of TRPs is excluded. As another example, M-TRP based DL scheduling may be performed based on TRPs associated with the CMR combination having the same/similar RXT.

[Proposal 2]

In the aforementioned Option 3 (improvement method based on non-group based beam reporting), an operation based on at least one of the following 1), 2) or 3) may be considered.

1) It may be agreed/defined/assumed between the base station and the terminal that simultaneous reception is possible for the first m (or/and last m) beams among the M beams reported in each CSI-ReportConfig (connected/related) of the terminal. It may be agreed/defined/assumed between the base station and the terminal that the remaining M-m beams are not guaranteeing for simultaneous reception.

2) It may be agreed/defined/assumed between the base station and the terminal that simultaneous reception is not guaranteed for up to the first m beams. It may be agreed/defined/assumed between the base station and the terminal that the remaining M-m beams may be simultaneously received.

3) The m value and whether simultaneous reception of the m value is possible/impossible may be set/instructed by the base station or reported by the terminal.

For example, CSI-ReportConfig 1={CMR 1, 2, 3, 4} and CSI-ReportConfig 2={CMR 5, 6, 7, 8} may be connected/associated for M-TRP beam reporting. When two beams are reported for each CSI-ReportConfig (M=2), the UE may report CMRs 1 and 2 based on CSI-ReportConfig 1 and report CMRs 5 and 6 based on CSI-ReportConfig 2. The first reported (i.e., m=1) beam (i.e., CMR 1 and 5 in each report) may be prescribed/defined/configured as being simultaneously receivable, and the second beam (i.e., CMR 2 and 6 in each report) may be prescribed/defined/configured that simultaneous reception is not guaranteed.

In this case, if m>1, the following operation/configuration may be considered in relation to whether simultaneous reception is guaranteed.

The base station may define/configure the following i) or ii) to the terminal, or instruct the terminal to switch the configured i) (or ii)) to ii) (or i).

i) Agree/define that simultaneous reception is possible by mapping 1:1 1st, 2nd. M-th CMR in order in each report ii) Agree/definition that a combination of any one of {1st, 2nd. m-th CMR} in report 1 and any one of {1st, 2nd. m-th CMR} in report 2 may be simultaneously received Alternatively, the terminal may report the information indicating i) or ii) to the base station.

Additionally, in addition to the m value and whether simultaneous reception of the m value is possible/not possible, whether a combination of m CMRs from each CSI-ReportConfig is received by the UE through the same Rx panel or different Rx panels may be defined/configured between terminals/base station. The combination of the m CMRs may include i) a 1:1 mapping combination of the 1st, 2nd, and m-th CMRs in each report, or ii) a combination including any one of {1st, 2nd, m-th CMR} in report 1 and any one of {1st, 2nd, m-th CMR} in report 2.

The terminal may report information indicating whether the combination of the m CMRs is received through the same Rx panel or different Rx panels to the base station.

[Proposal 3]

Hereinafter, a differential L1-RSRP/L1-SINR based beam reporting method for beam reporting operations based on the aforementioned Options (Option 1 to Option 3) will be described.

According to Rel-15/16 legacy operation, in L1-RSRP/L1-SINR based beam reporting, when the number of CMR/beams reported in CSI-ReportConfig by base station configuration is more than one, the terminal may report the L1-RSRP/L1-SINR value quantized with a 7-bit value for the best beam (or/and the largest measured value) and may report a differential L1-RSRP/L1-SINR value, which is a difference value from the best beam, as a 4-bit value quantized with a larger step size for the remaining beam(s).

A UE operation when the differential L1-RSRP/L1-SINR based beam reporting is performed by the UE In Option 1 to Option 3 is proposed.

i) When Differential L1-RSRP/L1-SINR Based Beam Reporting is Performed in Option 1

In Option 1, since each report group may correspond to each TRP, CMRs reported in a specific group may be CMRs from a specific TRP. In this case, when the number of CMRs reported in each group exceeds 1, the UE may report L1-RSRP/L1-SINR quantized as a 7-bit value in reporting L1-RSRP/L1-SINR of the 1st CMR, which is the best CMR in each group, and may report a differential L1-RSRP/L1-SINR, which is a difference from the best CMR, as a 4-bit value quantized with a larger step size, for the remaining CMR(s) reported in the group.

ii) When Differential L1-RSRP/L1-SINR Based Beam Reporting is Performed in Option 2

In Option 2, each report group may include a specific CMR combination (e.g., CMR combination from S-TRP, CMR combination from M-TRP). In this case, among the reported group(s), a first group may be the best group including the best CMR combination. When the reported number of groups exceeds one, the terminal may operate as follows. The UE may report the L1-RSRP/L1-SINR value quantized as a 7-bit value in the L1-RSRP/L1-SINR report of the CMR combination in the best group (first group), and may report a differential L1-RSRP/L1-SINR value as a 4-bit value quantized with a larger step size for the CMR combination in the remaining group(s).

More specifically, in Option 2, when the UE reports the 1st best beam pair in group 1 and the n-th best beam pair in group n, the UE may report the L1-RSRP/L1-SINR value of group 1 as a 7-bit value for each TRP so that the best CMR combination may be reported, may report the L1-RSRP/L1-SINR value of the 1st CMR of each remaining group as a relative value (difference value) based on the L1-RSRP/L1-SINR value of the 1st CMR in group 1, and may report the L1-RSRP/L1-SINR value of the m-th CMR of each remaining group as the relative value (difference value) based on the L1-RSRP/L1-SINR value of the m-th CMR in group 1.

Or/and, the UE may report the first CMR of each group as a 7-bit value and report the differential L1-RSRP/L1-SINR value as a 4-bit value quantized with a larger step size for the second CMR. Or/and, the UE may report only the first CMR of the first group as a 7-bit value and may report the differential L1-RSRP/L1-SINR value as a 4-bit value quantized with a larger step size for all remaining CMRs. Through the above operation, even if the number of beams reported through M-TRP specific beam reporting increases, reporting payload may be saved.

iii) When Differential L1-RSRP/L1-SINR Based Beam Reporting is Performed in Option 3

In Option 3, each CSI-ReportConfig (connected/associated with each other) may correspond to each TRP. CMRs reported in a specific CSI-ReportConfig may be CMRs from a specific TRP. In this case, when the number of CMRs reported in each CSI-ReportConfig exceeds 1, in reporting L1-RSRP/L1-SINR of the 1st CMR, which is the best CMR in each CSI-ReportConfig. the UE may report L1-RSRP/L1-SINR value quantized with a 7-bit value and may report the differential L1-RSRP/L1-SINR value, which is a difference from the best CMR as 4-bit value quantized with a larger step size for the remaining CMR(s).

Specifically, a method for reporting differential L1-RSRP/L1-SINR without UE ambiguity when the number of CMRs reported in each CSI-ReportConfig (connected/associated with each other) exceeds one is proposed.

The terminal may operate based on the following a) or b) when reporting the L1-RSRP/L1-SINR for the CMR(s) in each CSI-ReportConfig (connected/associated with each other).

a) The UE reports the L1-RSRP/L1-SINR value for the best beam (or/and largest measured value) among the CMR(s) corresponding to the m CMRs that can be simultaneously received in proposal 2 as a 7-bit value, and report L1-RSRP/L1-SINR value of the remaining CMR(s) as 4 bit value b) The UE reports the L1-RSRP/L1-SINR value for the best beam (or/and largest measured value) among the CMRs (s) corresponding to the remaining M-m CMRs without simultaneous reception restriction of proposal 2 to a 7-bit value, and report the L1-RSRP/L1-SINR value of the remaining CMR(s) as a 4-bit value That is, in the case of a), m CMR(s) are located in the first m (or/and best/largest value m) in the report, and in the case of b), the m CMR(s) in the report is located in the last m (or/and best/smallest value m).

Depending on the channel environment of the terminal, the m beams that can be simultaneously received may not correspond to the best beam, so b) may be regarded as a less risky operation in the terminal operation than a).

In the case of b), the best CMR among M-m CMRs without simultaneous reception restrictions may be reported, so that L1-RSRP/L1-SINR reporting may be performed for (last) m CMRs through a differential value with the corresponding best CMR. Depending on the terminal channel environment, the best CMR among M-m CMRs and the best CMR among m CMRs may be the same CMR. In this case, the two best CMRs are reported as the same index, and in the case of the best CMR among m CMRs, a differential L1-RSRP/The L1-SINR report value may be reported as 0 dB (i.e., no difference from the best beam).

The operations for a) and b) may be configured/defined by the base station or additionally performed in the report of the terminal.

With the operations of a) and b) above, the UE may recognize for which CMRs (m+(M−m)) of the reported CMRs, the 7-bit L1-RSRP/L1-SINR value needs to be reported, and may perform the differential L1-RSRP/L1-SINR reporting.

The i) operation for Option 1 of Proposal 3 is also applicable to Option 2. Or/and, ii) operation for Option 2 is also applicable to Option 1.

The index of the CMR (CSI-RS or/and SSB) reported in the operations of i), ii), and iii) may be expressed as a bit width corresponding to $\text{ceil}(\log_2(K_s^{CSI\text{-}RS}))$ $\text{ceil}(\log_2(K_s^{CSI\text{-}RS}))$ may correspond to the number of CSI-RS resource(s) (and/or SSB resource(s)) in the CSI resource set for channel measurement belonging to the CSI-ResourceConfig connected to the corresponding CSI-ReportConfig.

It is sequentially mapped from the lowest CSI-RS (and/or SSB) index in the corresponding CSI resource set for the lowest codepoint of the corresponding bit width.

Proposal 3 has an advantage that the UE may save the payload size transmitted (via PUSCH/PUCCH) when reporting the M-TRP related beam.

Prior to the beam reporting of proposals 1 and 2, in the CMR configuration for beam measurement of the CSI resource setting connected to CSI-ReportConfig, the base station configuration for distinguishing between the source TRP that transmits the CMR may be explicitly/implicitly preceded. For example, the base station may configure/connect a plurality of CSI resource sets (or CMR sets) configured in the CSI resource setting in units of sets. The UE may perform beam reporting of Proposal 1 and Proposal 2 based on the agreement/assumption that CMRs configured in different CSI resource sets are CMRs from different TRPs.

In the Proposals 1 to 3 (i, ii, and iii of Proposals 1, 2, and 3), each proposal may be independently applied to an operation between a base station and a terminal, and a combination of at least one or more of proposals 1 to 3 may be applied to operations between a base station and a terminal.

Hereinafter, a method that may be additionally applied to at least one of the above Proposals 1 to 3 will be described. The method described below may be applied to base station-terminal operation independently of Proposals 1 to 3.

As shown in Table 12 below, according to 3GPP standardization, different (two) CMR resource sets have been enhanced so that they may be set/associated with a single CMR resource setting (or/and reportConfig), and the terminal may perform M-TRP specific beam reporting based on the agreement/assumption that the CMRs from different CMR resource sets are CMRs from different TRPs.

Table 12 below is additional agreements related to TRP-specific beam measurement and reporting.

TABLE 12

Agreement
For beam measurement in support of M-TRP simultaneous transmission
  Support a single CSI-report consisting of N beams pairs/groups and M (M>1) beams per pair/group, and different beams within a pair/group may be received simultaneously
    Support M = 2
    Support extending the maximum value of N > 1, exact value FFS
    N=1 and N=2
      FFS: Other values larger than 2
      FFS: Whether the UE could report beams are received with different RX beams
    Further study the support of option 1 and option 3
    The above applies at least for L1-RSRP
    FFS: L1-SINR
  Agreement
  For beam measurement/reporting option 2, the maximum number of beam groups in a single CSI-report is a UE capability and may take value from $N_{max} = \{1,2,3,4\}$ in Rel.17.
    FFS: If UCI payload reduction for $N_{max} \geq 2$ is needed and if so, how
    The number of beam groups (N) reported in a single CSI-report
    Alt1: The value of N is configured by RRC signaling
  Agreement
  On CMR resource configuration for beam reporting option 2, decide in RAN1#105-e whether to adopt "set" or "subset":
    NOTE: the following has been agreed
      Two CMR resource sets or subsets, per periodic/semi-persistent CMR resource setting
        FFS : extension to aperiodic CMR resource setting if two CMR resource sets are supported
      Each reported beam pair in a single CSI -report consists of M = 2 SSBRI/CRI values, where each SSBRI /CRI points to a CMR resource in a different CMR resource set or subset.

TABLE 12-continued

FFS : bit width of each SSBRI/CRI determined based on the number
of SSB/CSI-RS resources from the associated set/subset, or across two
sets/subsets
    Agreement
    For CMR configuration for option 2, adopt
    Alt-1: "set"
    Agreement
    The bit width of each SSBRI/CRI is determined based on the number
of SSB/CSI-RS resources in the associated CMR resource set
    FFS: specify the association between SSBRIs/CRIs in a reported
group and CMR resource sets According to the Option 2-based beam reporting opera-
tion, the terminal may report a plurality of (up to 4)
pairs/groups, and each group may include different CMRs
from different TRPs (from the different CMR resource set
per CMR setting). It was agreed that the local index or bit
width of each CMR in a group is determined from the
number of CMRs in each CMR resource set. In this case,
there is an ambiguous problem (problem 1) of how to
assume and report the index and order of different CMR
resources in each group.

Hereinafter, a solution to the above problem 1 is
described. Specifically, methods for assuming/defining the
order and bit width configuration of two CMRs in each
group between a base station and a terminal in reporting on
a plurality of (N) groups when Option 2-based beam report-
ing is performed are described.

When the UE selects a CMR from two CMR (CSI)
resource sets when reporting two CMRs in each group (in
reporting payload), the UE may perform group-based beam
reporting on the assumption that the CMR resource selected
from the first/lowest CMR (CSI) resource set among the two
sets is located first.

That is, it may be assumed that CMR resource set #1 and
CMR resource set #2 exist in the CMR resource setting
associated with reportConfig #1 for M-TRP specific beam
reporting. In this case, the order of CMR resources within
each group may be assumed/defined/defined as follows.

i) CMR index from CMR resource set #1, ii) CMR index
from CMR resource set #2

In CSI configuration, a case in which there are 4 CMR
resources in CMR resource set #1 and 8 CMR resources in
CMR resource set #2 will be described in detail below.

A bit width of the local index to express CMR in CMR
resource set #1 is 2 bits as $\log_2 4$, and a bit width of local
index to express CMR in CMR resource set #2 is 3 bits as
$\log_2 8$. In this case, when the proposal for problem 1 is
applied, each group includes a 5-bit payload including
information on two CMRs. In the corresponding payload, 2
bits representing the CMR index in CMR resource set #1,
among 5 bits, may be located first and 3 bits representing the
CMR index in CMR resource set #2, among 5 bits, may be
located later.

The proposal for problem 1 is applicable to proposals 1,
2 and 3 above.

Meanwhile, when a group quantity for each group is
configured or reporting is performed by the UE for the group
quantity in Option 2-based beam reporting as in proposal 1,
the following problem (problem 2) may occur. Specifically,
the problem (problem 2) arises in that the bit width of the
two CMRs included in the group and the order regulation/
assumption/definition between the CMRs become ambigu-
ous according to the group quantity of each group.

As a solution to the above problem 2, the following
operation may be considered.

The base station may set a group quantity for each group.
At this time, the group quantity of each group may be
configured to report an S-TRP beam pair, an M-TRP beam
pair, a beam pair that can be simultaneously received, or a
beam pair that cannot be simultaneously received. When the
group quantity is configured to report the S-TRP beam pair,
additional configuration may be performed on which TRP
(which CMR resource set) to report from different TRPs
(from the different CMR resource set per CMR resource
setting). Or/and, this criterion may be prescribed/defined as
a pre-defined rule rather than a base station setting (e.g., it
is prescribed/defined to report an S-TRP beam pair based on
a first/lowest CMR (CSI) resource set)).

For example, in the CSI configuration example of prob-
lem 1 (CMR resource set #1 and CMR resource set #2 exist),
the base station may set to report an S-TRP beam pair based
on CMR resource set #1 for beam reporting of a specific
group. Depending on the setting of the base station, the
index and bit width of the CMR in the group may be
expressed without ambiguity. For example, in the example
related to problem 1, when an S-TRP beam pair is reported
based on set #1, the bit width of each CMR in the group
becomes 2 bits. When the S-TRP beam-pair is reported
based on set #2, the bit width of each CMR in the group
becomes 3 bits.

As another example, the base station may set N reporting
group(s) and perform operations according to the following
1) and 2).

1) When the base station instructs to report the S-TRP
        beam pair for one of the configured groups, it config-
        ures/instructs to report the S-TRP beam pair based on
        the first/lowest CMR (CSI) resource set
    2) The base station configures/instructs to report the
        S-TRP beam pair for two groups among the configured
        groups Based on the configuration/instruction, the UE may report
the S-TRP beam pair based on the first/lowest CMR (CSI)
resource set for the first group, and may report the S-TRP
beam pair based on the remaining CMR (CSI) resource sets
for the second groups.

In addition, when the base station configures group quan-
tity to report the best beam pair without distinction of
M-TRP/S-TRP for a specific group, the indexing and bit
width of each CMR in the group may be prescribed/defined
to be generated based on all CMRs existing in the CMR
resource set #1 and CMR resource set #2.

Specifically, if there are 4 CMR resources in CMR
resource set #1 and 8 CMR resources in CMR resource set
2, $\text{ceil}(\log_2(4+8))=4$ becomes the bit width of CMR is in
the corresponding group, and the local index may be based
on the global RS index of all resources in the two CMR
resource sets. The terminal may perform beam reporting by
configuring a reporting payload in a form filled from the
payload for the lowest local index.

In addition, as another solution to the above problem 2,
the following operation may be considered.

When the UE is configured to report the S-TRP beam pair
for a specific group, when reporting the S-TRP beam pair,
information on which TRP (or/and CMR resource set) is
based on to report the S-TRP beam pair may be additionally
included in the corresponding reporting payload. The base
station may first detect this corresponding information (re-
porting payload) and perform decoding on the remaining
reporting payload without ambiguity regarding CMR index-
ing or/and bit width in each group.

Through the operation between the base station and the
terminal, the base station may perform decoding without ambiguity when receiving/detecting the reporting payload in M-TRP beam reporting of the terminal.

An example of a terminal (or base station) operation based on at least one of the aforementioned embodiments (e.g., at least one of proposals 1 to 3 (i, ii, and iii of proposals 1, 2, and 3)) is as follows.

1) Receiving (transmitting) configuration information related to CSI resource setting (RRC IE CSI-ResourceConfig) and CSI report setting (RRC IE CSI-ReportConfig)

The CSI resource setting configuration information includes a plurality of CMR settings, and information that a specific CMR is a CMR a TRP different from that of another CMR may be additionally included.

The CSI reporting setting configuration information may include configuration information for Options 1, 2, and 3, and may include configuration information for group quantity.

2) Receiving (transmitting) a message that configures/instructs beam reporting for a specific CSI report setting The message may include configuration information for group quantity 3) The terminal performs beam reporting for the specific CSI report setting based on the message based on at least one of proposals 1 to 3

The terminal/base station operation is only an example, each operation (or step) is not necessarily essential, and operations related to beam reporting of the terminal according to the aforementioned embodiments may be omitted or added depending on the terminal/base station implementation method.

Operations of the base station/terminal according to the aforementioned embodiments in terms of implementation (beam reporting operation based on at least one of proposals 1 to 3 (i, ii, and iii of proposals 1, 2, and 3)) may be performed by a device of FIGS. 13 to 17 to be described below (e.g., processors 102 and 202 of FIG. 14).

Figure 14:
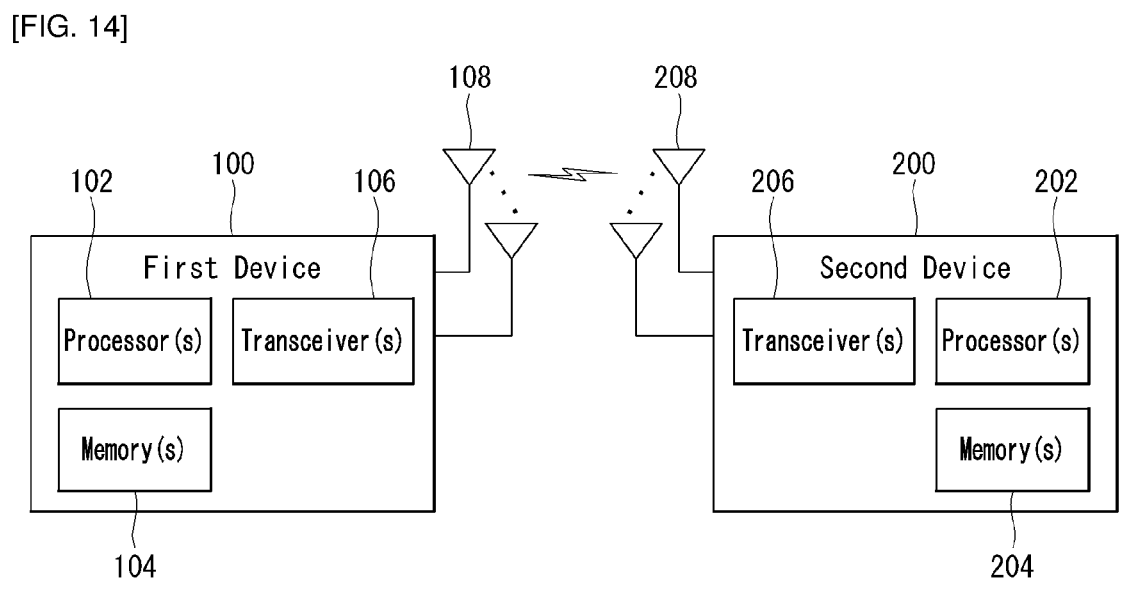

In addition, the operation of the base station/terminal according to the aforementioned embodiment (beam reporting operation based on at least one of proposals 1 to 3 (i, ii, and iii of proposals 1, 2, and 3)) may be stored in the form of instructions/programs (e.g., instruction, executable code) for driving at least one processor (e.g., 102 and 202 of FIG. 14).

Hereinafter, the aforementioned embodiments will be described in detail with reference to FIG. 11 in terms of operation of the terminal. The methods described below are only classified for convenience of description, and some components of one method may be substituted with some components of another method or may be applied in combination with each other.

FIG. 11 is a flowchart illustrating a method for reporting channel state information by a terminal in a wireless communication system according to an embodiment of the present disclosure.

Referring to FIG. 11, a method for reporting channel state information (CSI) by a terminal in a wireless communication system according to an embodiment of the present disclosure includes a CSI-related configuration information receiving operation (S1110), a DL RS receiving operation (S1120), a CSI calculation operation (S1130) and a CSI reporting operation (S1140).

In S1110, the terminal receives configuration information related to channel state information (CSI) from a base station. The configuration information related to the CSI may be based on the configuration information S1010 related to the CSI of FIG. 10.

Operation of the terminal (100/200 of FIGS. 13 to 17) receiving configuration information related to channel state information (CSI) from the base station (100/200 of FIGS. 13 to 17) according to the aforementioned operation S1110 may be implemented by the device of FIGS. 13 to 17. For example, referring to FIG. 14, one or more processors 102 may control one or more transceivers 106 and/or one or more memories 104 to receive configuration information related to channel state information (CSI) from a base station 200.

In S1120, the UE receives a downlink reference signal (DL RS) from the base station.

According to an embodiment, the DL RS may be based on at least one of a channel state information-reference signal (CSI-RS) or a synchronization signal block (SSB). The DL RS may be based on CMR according to proposals 1 to 3 described above.

According to the aforementioned operation S1120, an operation in which the terminal (100/200 of FIGS. 13 to 17) receives a downlink reference signal (DL RS) from the base station (100/200 of FIGS. 13 to 17) may be implemented by the device shown in FIGS. 13 to 17. For example, referring to FIG. 14, one or more processors 102 may control one or more transceivers 106 and/or one or more memories 104 to receive a downlink reference signal (DL RS) from the base station 200.

In S1130, the UE calculates the CSI based on the DL RS. The calculation of the CSI may be performed based on the operation S1022 of FIG. 10 described above.

According to the aforementioned operation S1130, the operation of the UE (100/200 of FIGS. 13 to 17) calculating the CSI based on the DL RS may be implemented by the device of FIGS. 13 to 17. For example, referring to FIG. 14, one or more processors 102 may control one or more transceivers 106 and/or one or more memories 104 to calculate the CSI based on the DL RS.

In S1140, the terminal reports the CSI to the base station.

According to an embodiment, the CSI may be related to group based beam reporting. For example, the configuration information (reporting setting (CSI-ReportConfig) included in the configuration information) may include a groupBasedBeamReporting parameter set to 'enabled'.

According to an embodiment, a specific criterion for reporting the CSI may be set for each group based on the configuration information. The present embodiment may be based on at least one of proposals 1 to 3 described above. The specific criterion may be based on 'group quantity' according to the aforementioned embodiments. For example, a parameter indicating the specific criterion (group quantity) may be set for each group based on the configuration information.

The CSI may include information on one or more DL RSs based on the specific criterion for each group.

For example, the specific criterion may be related to whether the one or more DL RSs may be simultaneously received by the terminal. For the group for which the specific criterion is set, information on DL RSs that can be simultaneously received by the terminal may be reported. Alternatively, information on DL RSs that cannot be simultaneously received by the terminal may be reported for the group for which the specific criterion is set. Whether to simultaneously receive by the terminal may be determined based on a single TRP (S-TRP) or a plurality of TRPs (M-TRP).

For example, the specific criterion may relate to whether the one or more DL RSs are associated with a single transmission and reception point (TRP) or a plurality of TRPs. Information on DL RSs associated with the single TRP may be reported for the group for which the specific criterion is set. Information on DL RSs associated with the plurality of TRPs may be reported for the group for which the specific criterion is set. As a more specific example, among the DL RSs associated with the single TRP (or a plurality of TRPs), information on DL RSs whose reception quality (e.g., L1-RSRP/L1-SINR) is determined in the highest order may be reported.

For example, the specific criterion may relate to whether the one or more DL RSs may be received by the same panel or different panels. In this case, the panel may refer to an Rx panel of the terminal. For the group for which the specific criterion is set, information on DL RSs that may be received through the same panel may be reported. Information on DL RSs that may be received through different panels may be reported for the group for which the specific criterion is set.

For example, the specific criterion may relate to whether the one or more DL RSs may be received based on synchronous reception or asynchronous reception. The present embodiment may be applied when DL RSs received by the UE are transmitted from a plurality of TRPs.

Information on DL RSs that may be received based on the synchronous reception may be reported for the group for which the specific criterion is set. DL RSs that may be received based on the synchronous reception may be based on a combination of DL RSs in which a difference between Rx timings according to DL RSs is less than or equal to a predefined threshold.

Information on DL RSs that may be received based on the asynchronous reception may be reported for the group for which the specific criterion is set. DL RSs that may be received based on the synchronous reception may be based on a combination of DL RSs in which a difference between reception timings (Rx timings) according to DL RSs is greater than the predefined threshold value.

Regarding the aforementioned problem 1, it is necessary to determine the order of DL RSs reported for each group.

According to an embodiment, based on the one or more DL RSs determined from a plurality of DL RS resource sets, the order of the one or more DL RSs may be determined based on the DL RS resource set of the lowest index among the plurality of DL RS resource sets.

The payload for each group of the CSI may include bit widths determined based on the plurality of DL RS resource sets. Each bit width may be determined based on the number of DL RS resources in each DL RS resource set.

The payload for each group of the CSI may be generated such that a bit width representing a DL RS determined from a DL RS resource set having the lowest index among the one or more DL RSs is located at the frontmost position.

It may be assumed that the specific criterion is set to indicate the DL RS associated with the single TRP as a reporting target for the corresponding group. In this case, the order of the DL RS and the CSI payload may be determined as follows.

According to an embodiment, based on that i) the one or more DL RSs are associated with the single TRP and ii) the one or more DL RSs are determined from a plurality of DL RS resource sets, the one or more DL RSs may be based on a specific DL RS resource set among the plurality of DL RS resource sets. The specific DL RS resource set may be a DL RS resource set having a specific index (e.g., lowest index).

The payload for each group of the CSI may include a bit width determined based on the specific DL RS resource set. The bit width may be determined based on the number of DL RS resources in the specific DL RS resource set.

It may be assumed that the specific criterion is set to report the best beam pair (DL RSs having the best quality) regardless of S-TRP/M-TRP. In this case, the order of the DL RS and the CSI payload may be determined as follows.

According to an embodiment, based on that i) the specific criterion is related to reception quality measured by the terminal without distinction of transmission and reception point (TRP) and ii) the one or more DL RSs are determined from a plurality of DL RS resource sets, the order of the one or more DL RSs may be determined based on a global RS index associated with all DL RS resources included in the plurality of DL RS resource sets. The order of the one or more DL RSs may be based on a local index related to the configuration of the CSI payload mentioned in proposal 3.

The payload for each group of the CSI may include bit widths determined based on the plurality of DL RS resource sets. The bit widths in the payload for each group of the CSI may be arranged based on the order of the one or more DL RSs.

According to the aforementioned operation S1140, the operation of the terminal (100/200 of FIGS. 13 to 17) reporting the CSI to the base station (100/200 of FIGS. 13 to 17) may be implemented by the device of FIGS. 13 to 17. For example, referring to FIG. 14, one or more processors 102 may control one or more transceivers 106 and/or one or more memories 104 to report the CSI to base station 200.

Hereinafter, the aforementioned embodiments will be described in detail with reference to FIG. 12 in terms of operation of the base station. The methods described below are only classified for convenience of description, and some components of one method may be substituted with some components of another method or may be applied in combination with each other.

FIG. 12 is a flowchart illustrating a method for receiving channel state information by a base station in a wireless communication system according to another embodiment of the present disclosure.

Referring to FIG. 12, the method for receiving channel state information (CSI) by a base station in a wireless communication system according to another embodiment of the present disclosure includes a CSI-related configuration information transmission operation (S1210), a DL RS transmission operation (S1220), and CSI receiving operation (S1230).

In S1210, the base station transmits configuration information related to channel state information (CSI) to the terminal. The configuration information related to the CSI may be based on the configuration information S1010 related to the CSI of FIG. 10.

Operation of the base station (100/200 of FIGS. 13 to 17) transmitting configuration information related to channel state information (CSI) to the terminal (100/200 of FIGS. 13 to 17) according to the aforementioned operation S1210 may be implemented by the device of FIGS. 13 to 17. For example, referring to FIG. 14, one or more processors 202 may control one or more transceivers 206 and/or one or more memories 204 to transmit configuration information related to channel state information (CSI) to the terminal 100.

In S1220, the base station transmits a downlink reference signal (DL RS) to the terminal.

According to an embodiment, the DL RS may be based on at least one of a channel state information-reference signal (CSI-RS) or a synchronization Signal block (SSB). The DL RS may be based on the CMR according to proposals 1 to 3 described above.

According to the aforementioned operation S1220, an operation in which the base station (100/200 of FIGS. 13 to 17) transmits a downlink reference signal (DL RS) to the terminal (100/200 of FIGS. 13 to 17) may be implemented by the device of FIGS. 13 to 17. For example, referring to FIG. 14, one or more processors 202 may control one or more transceivers 206 and/or one or more memories 204 to transmit a downlink reference signal (DL RS) to the terminal 100.

In S1230, the base station receives the CSI from the terminal.

Specifically, the UE calculates the CSI based on the DL RS. The base station receives the CSI calculated by the terminal. The calculation of the CSI may be performed based on the operation S1022 of FIG. 10 described above.

According to an embodiment, the CSI may be related to group based beam reporting. For example, the configuration information (reporting setting (CSI-ReportConfig) included in) may include a groupBasedBeamReporting parameter set to 'enabled'.

According to an embodiment, a specific criterion for reporting the CSI may be set for each group based on the configuration information. The present embodiment may be based on at least one of proposals 1 to 3 described above. The specific criterion may be based on 'group quantity' according to the aforementioned embodiments. For example, a parameter (group quantity) indicating the specific criterion may be set for each group based on the configuration information.

The CSI may include information on one or more DL RSs based on the specific criterion for each group.

For example, the specific criterion may be related to whether the one or more DL RSs may be simultaneously received by the terminal. For the group for which the specific criterion is set, information on DL RSs that can be simultaneously received by the terminal may be reported. Alternatively, information on DL RSs that cannot be simultaneously received by the terminal may be reported for the group for which the specific criterion is set. Whether to simultaneously receive by the terminal may be determined based on a single TRP (S-TRP) or a plurality of TRPs (M-TRP).

For example, the specific criterion may relate to whether the one or more DL RSs are associated with a single transmission and reception point (TRP) or a plurality of TRPs. Information on DL RSs associated with the single TRP may be reported for the group for which the specific criterion is set. Information on DL RSs associated with the plurality of TRPs may be reported for the group for which the specific criterion is set. As a more specific example, among the DL RSs associated with the single TRP (or a plurality of TRPs), information on DL RSs whose reception quality (e.g., L1-RSRP/L1-SINR) is determined in the highest order may be reported.

For example, the specific criterion may relate to whether the one or more DL RSs may be received by the same panel or different panels. In this case, the panel may refer to an Rx panel of the terminal. For the group for which the specific criterion is set, information on DL RSs that may be received through the same panel may be reported. Information on DL RSs that may be received through different panels may be reported for the group for which the specific criterion is set.

For example, the specific criterion may relate to whether the one or more DL RSs may be received based on syn-chronous reception or asynchronous reception. The present embodiment may be applied when DL RSs received by the UE are transmitted from a plurality of TRPs.

Information on DL RSs that may be received based on the synchronous reception may be reported for the group for which the specific criterion is set. DL RSs that may be received based on the synchronous reception may be based on a combination of DL RSs in which a difference between Rx timings according to DL RSs is less than or equal to a predefined threshold.

Information on DL RSs that may be received based on the asynchronous reception may be reported for the group for which the specific criterion is set. DL RSs that may be received based on the asynchronous reception may be based on a combination of DL RSs in which a difference between reception timings (Rx timings) according to DL RSs is greater than the predefined threshold value.

Regarding the aforementioned problem 1, it is necessary to determine the order of DL RSs reported for each group.

According to an embodiment, based on the one or more DL RSs determined from a plurality of DL RS resource sets, the order of the one or more DL RSs may be determined based on the DL RS resource set of the lowest index among the plurality of DL RS resource sets.

The payload for each group of the CSI may include bit widths determined based on the plurality of DL RS resource sets. Each bit width may be determined based on the number of DL RS resources in each DL RS resource set.

The payload for each group of the CSI may be generated such that a bit width representing a DL RS determined from a DL RS resource set having the lowest index among the one or more DL RSs is located at the frontmost position.

It may be assumed that the specific criterion is set to indicate the DL RS associated with the single TRP as a reporting target for the corresponding group. In this case, the order of the DL RS and the CSI payload may be determined as follows.

According to an embodiment, based on that i) the one or more DL RSs are associated with the single TRP and ii) the one or more DL RSs are determined from a plurality of DL RS resource sets, the one or more DL RSs may be based on a specific DL RS resource set among the plurality of DL RS resource sets. The specific DL RS resource set may be a DL RS resource set having a specific index (e.g., lowest index).

The payload for each group of the CSI may include a bit width determined based on the specific DL RS resource set. The bit width may be determined based on the number of DL RS resources in the specific DL RS resource set.

It may be assumed that the specific criterion is set to report the best beam pair (DL RSs having the best quality) regardless of S-TRP/M-TRP. In this case, the order of the DL RS and the CSI payload may be determined as follows.

According to an embodiment, based on that i) the specific criterion is related to reception quality measured by the terminal without distinction of transmission and reception point (TRP) and ii) the one or more DL RSs are determined from a plurality of DL RS resource sets, the order of the one or more DL RSs may be determined based on a global RS index associated with all DL RS resources included in the plurality of DL RS resource sets. The order of the one or more DL RSs may be based on a local index related to the configuration of the CSI payload mentioned in proposal 3.

The payload for each group of the CSI may include bit widths determined based on the plurality of DL RS resource sets. The bit widths in the payload for each group of the CSI may be arranged based on the order of the one or more DL RSs.

According to the aforementioned operation S1230, the operation of the base station (100/200 of FIGS. 13 to 17) receiving the CSI from the terminal (100/200 of FIGS. 13 to 17) may be implemented by the device of FIGS. 13 to 17. For example, referring to FIG. 14, one or more processors 202 may control one or more transceivers 206 and/or one or more memories 204 to receive the CSI from the terminal 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR), such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers, such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies, such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 15 illustrates a signal process circuit for a transmission signal.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 16 illustrates another example of a wireless device applied to the present disclosure.

The wireless device may be implemented in various forms according to a use-case/service (refer to FIG. 13). Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 17 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method comprising:
   receiving, by a user equipment (UE), configuration information related to channel state information (CSI), wherein the CSI is related to group-based beam reporting;

receiving, by the UE, downlink reference signals (DL RSs), wherein the DL RSs include at least one of a CSI-Reference Signal (CSI-RS) based on CSI-RS resources or a Synchronization Signal/Physical Broadcast Channel Block (SS/PBCH Block, SSB) based on SSB resources;

computing, by the UE, at least one L1-Reference Signal Received Power (RSRP) based on a measurement of the DL RSs; and reporting, by the UE, the CSI including the least one L1-RSRP, wherein the CSI includes i) at least one CSI-RS Resource Indicator (CRI) or at least one SS/PBCH Block Resource Indicator (SSBRI) for each of one or more groups and ii) the at least one L1-RSRP of the at least one CRI or the at least one SSBRI for each of the one or more groups, wherein based on the configuration information, a group quantity is separately configured for each of the one or more groups, wherein the group quantity is related to one of predefined criteria, and the predefined criteria include at least one of i) a criterion based on a single transmission and reception point (TRP) and ii) a criterion based on a plurality of transmission and reception points (TRPs).

2. The method of claim 1, wherein the predefined criteria further include a criterion based on whether at least one DL RS based on the at least one CRI or the at least one SSBRI can be simultaneously received by the UE.

3. The method of claim 1, wherein, for a group based on the criterion based on the single TRP, the CSI includes the at least one CRI or the at least one SSBRI which is associated with the single TRP, wherein, for a group based on the criterion based on the plurality of the TRPs, the CSI includes the at least one CRI or the at least one SSBRI which is associated with the plurality of TRPs.

4. The method of claim 3, wherein based on that i) the at least one CRI or the at least one SSBRI is associated with the single TRP, and ii) the at least one CRI or the at least one SSBRI is determined from a plurality of DL RS resource sets, the at least one CRI or the at least one SSBRI is based on a specific DL RS resource set, among the plurality of DL RS resource sets.

5. The method of claim 4, wherein a payload for each group of the CSI includes a bitwidth determined based on the specific DL RS resource set, and wherein the bitwidth is determined based on the number of DL RS resources in the specific DL RS resource set.

6. The method of claim 1, wherein the predefined criteria further include a criterion based on whether at least one DL RS based on the at least one CRI or the at least one SSBRI can be received by a same panel or different panels.

7. The method of claim 1, the predefined criteria further include a criterion based on whether at least one DL RS based on the at least one CRI or the at least one SSBRI can be received based on synchronous reception or asynchronous reception.

8. The method of claim 1, wherein, based on the at least one CRI or the at least one SSBRI determined from a plurality of DL RS resource sets, an order of the at least one CRI or the at least one SSBRI is determined based on a DL RS resource set having a lowest index, among the plurality of DL RS resource sets.

9. The method of claim 8, wherein a payload for each group of the CSI includes bitwidth determined based on the plurality of DL RS resource sets, and wherein each bitwidth is determined based on the number of DL RS resources in each DL RS resource set.

10. The method of claim 8, wherein a payload for each group of the CSI is generated so that a bitwidth representing a CRI or a SSBRI determined from the DL RS resource set having the lowest index, among at least one DL RS resource based on the at least one CRI or at least one SSBRI, is located at a frontmost.

11. The method of claim 1, wherein based on that i) the predefined criteria further include a specific criterion based on reception quality measured by the UE without distinction of a TRP and ii) at least one CRI or at least one SSBRI of a group, for which the specific criterion is configured, is determined from a plurality of DL RS resource sets, an order of the at least one CRI or at least one SSBRI is determined based on a global RS index related to all DL RS resources included in the plurality of DL RS resource sets.

12. The method of claim 11, wherein a payload for each group of the CSI includes bitwidth determined based on the plurality of DL RS resource sets, and wherein the bitwidth are arranged based on the order of the at least one CRI or at least one SSBRI in the payload for each group of the CSI.

13. A user equipment (UE) comprising:

one or more transceivers;

one or more processors; and one or more memories operably connectable to the one or more processors and configured to store instructions set, when executed by the one or more processors, to allow the one or more processors to perform operations, wherein the operations include:

receiving configuration information related to channel state information (CSI), wherein the CSI is related to group-based beam reporting;

receiving downlink reference signals (DL RSs), wherein the DL RSs include at least one of a CSI-Reference Signal (CSI-RS) based on CSI-RS resources or a Synchronization Signal/Physical Broadcast Channel Block (SS/PBCH Block, SSB) based on SSB resources;

computing at least one L1-Reference Signal Received Power (RSRP) based on a measurement of the DL RSs; and reporting the CSI including the least one L1-RSRP, wherein the CSI includes i) at least one CSI-RS Resource Indicator (CRI) or at least one SS/PBCH Block Resource Indicator (SSBRI) for each of one or more groups and ii) the at least one L1-Reference Signal Received Power (RSRP) value of the at least one CRI or the at least one SSBRI for each of the one or more groups, wherein, based on the configuration information, a group quantity is separately configured for each of the one or more groups, wherein the group quantity is related to one of predefined criteria, and the predefined criteria include at least one of i) a criterion based on a single transmission and reception point (TRP) and ii) a criterion based on a plurality of transmission and reception points (TRPs).

14. A base station comprising:

one or more transceivers;

one or more processors; and one or more memories operably connectable to the one or more processors and configured to store instructions set, when executed by the one or more processors, to allow the one or more processors to perform operations, wherein the operations include:

transmitting configuration information related to channel state information (CSI), wherein the CSI is related to group-based beam reporting;

transmitting downlink reference signals (DL RSs), wherein the DL RSs include at least one of a CSI-Reference Signal (CSI-RS) based on CSI-RS resources or a Synchronization Signal/Physical Broadcast Channel Block (SS/PBCH Block, SSB) based on SSB resources; and receiving the CSI including at least one L1-Reference Signal Received Power (RSRP) computed based on a measurement of the DL RSs, wherein the CSI includes i) at least one CSI-RS Resource Indicator (CRI) or at least one SS/PBCH Block Resource Indicator (SSBRI) for each of one or more groups and ii) the at least one L1-RSRP of the at least one CRI or the at least one SSBRI for each of the one or more groups, wherein, based on the configuration information, a group quantity is separately configured for each of the one or more groups, wherein the group quantity is related to one of predefined criteria, and the predefined criteria include at least one of i) a criterion based on a single transmission and reception point (TRP) and ii) a criterion based on a plurality of transmission and reception points (TRPs).

* * * * *